(12) United States Patent
Hamano

(10) Patent No.: US 8,350,954 B2
(45) Date of Patent: Jan. 8, 2013

(54) IMAGE PROCESSING APPARATUS AND IMAGE PROCESSING METHOD WITH DECONVOLUTION PROCESSING FOR IMAGE BLUR CORRECTION

(75) Inventor: Hideyuki Hamano, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 239 days.

(21) Appl. No.: 12/817,704

(22) Filed: Jun. 17, 2010

(65) Prior Publication Data

US 2011/0007176 A1 Jan. 13, 2011

(30) Foreign Application Priority Data

Jul. 13, 2009 (JP) ................................. 2009-165054

(51) Int. Cl.
*H04N 5/232* (2006.01)

(52) U.S. Cl. ........................................ 348/349; 349/345

(58) Field of Classification Search .......... 348/348–354, 348/222.1; 358/518, 519; 382/255; 396/52, 396/55
See application file for complete search history.

(56) References Cited

U.S. PATENT DOCUMENTS

| 5,955,753 | A | 9/1999 | Takahashi |
| 6,822,758 | B1 | 11/2004 | Morino |
| 6,829,008 | B1 | 12/2004 | Kondo et al. |
| 2002/0015587 | A1 * | 2/2002 | Ohishi et al. ..................... 396/55 |
| 2003/0081137 | A1 * | 5/2003 | Yamazaki ...................... 348/354 |
| 2004/0207743 | A1 | 10/2004 | Nozaki et al. |
| 2006/0238832 | A1 * | 10/2006 | Ohsawa ......................... 358/518 |
| 2008/0151065 | A1 * | 6/2008 | Okumura et al. .......... 348/208.4 |
| 2008/0175574 | A1 * | 7/2008 | Tomita et al. .................... 396/55 |
| 2009/0066815 | A1 | 3/2009 | Nozaki et al. |
| 2009/0115882 | A1 * | 5/2009 | Kawarada ..................... 348/340 |
| 2010/0002086 | A1 * | 1/2010 | Chien et al. ................ 348/208.2 |
| 2010/0194971 | A1 * | 8/2010 | Li et al. ......................... 348/349 |

FOREIGN PATENT DOCUMENTS

| JP | 09-046596 | | 2/1997 |
| JP | 2000-020691 | | 1/2000 |
| JP | 2000-156823 | | 6/2000 |
| JP | 2004-317699 | | 11/2004 |
| JP | 2007-282119 | A | 10/2007 |
| JP | 2008-516299 | A | 5/2008 |

OTHER PUBLICATIONS

The above references were cited in a Sep. 14, 2012 Japanese Office Action, a copy of which is enclosed without an English Translation, that issued in Japanese Patent Application No. 2009-165054.

* cited by examiner

*Primary Examiner* — Tuan Ho

(74) *Attorney, Agent, or Firm* — Cowan, Liebowitz & Latman, P.C.

(57) ABSTRACT

An image processing method includes a restore step of performing blur restoration for image data, an acquisition step of acquiring image-related information stored together with the image data, and an extraction step of extracting the range of object distances at which the blur restoration is performed, based on the image-related information. In the restore step, blur restoration is performed for the image data in the range of object distances extracted in the extraction step.

9 Claims, 17 Drawing Sheets

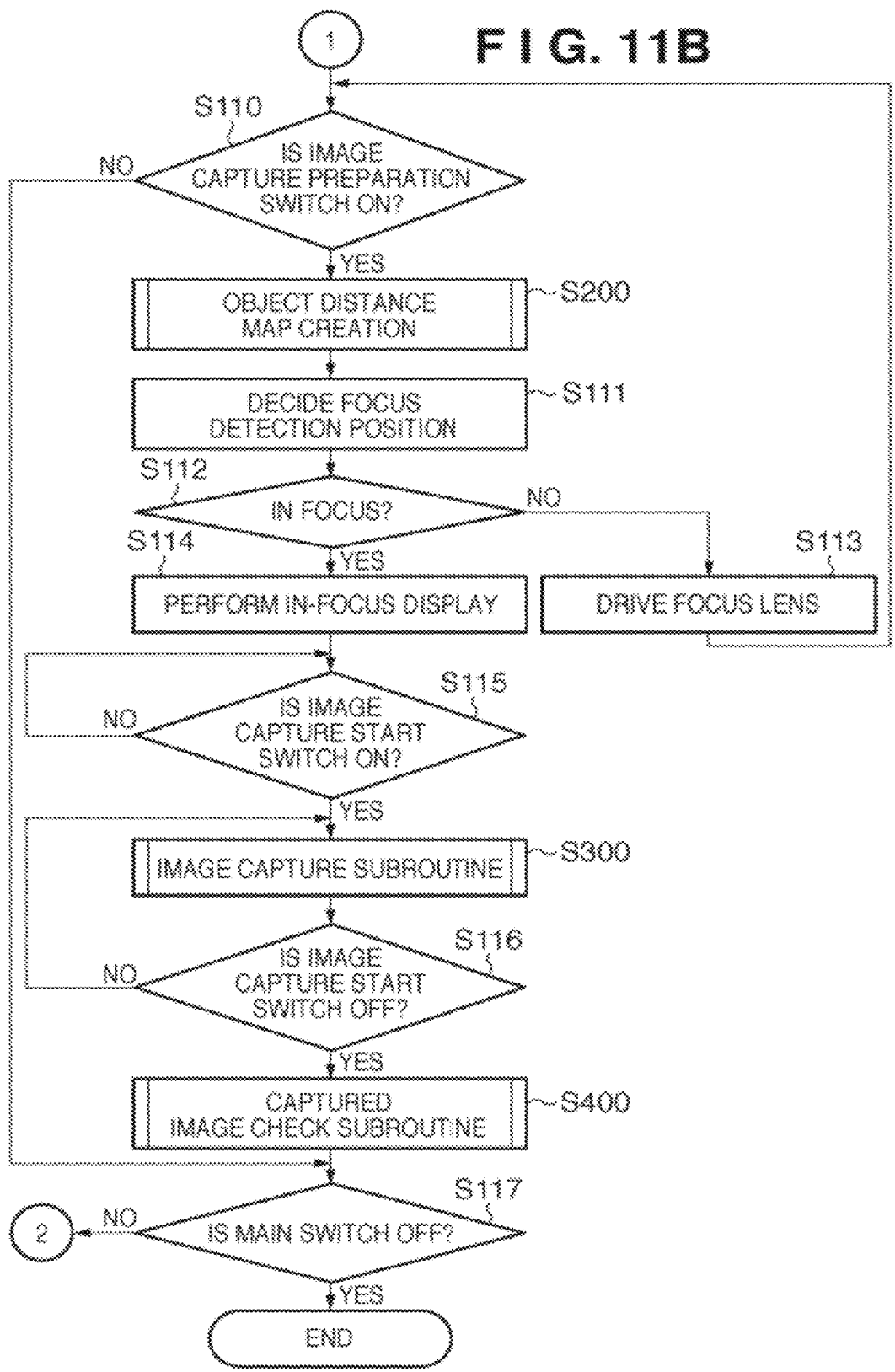

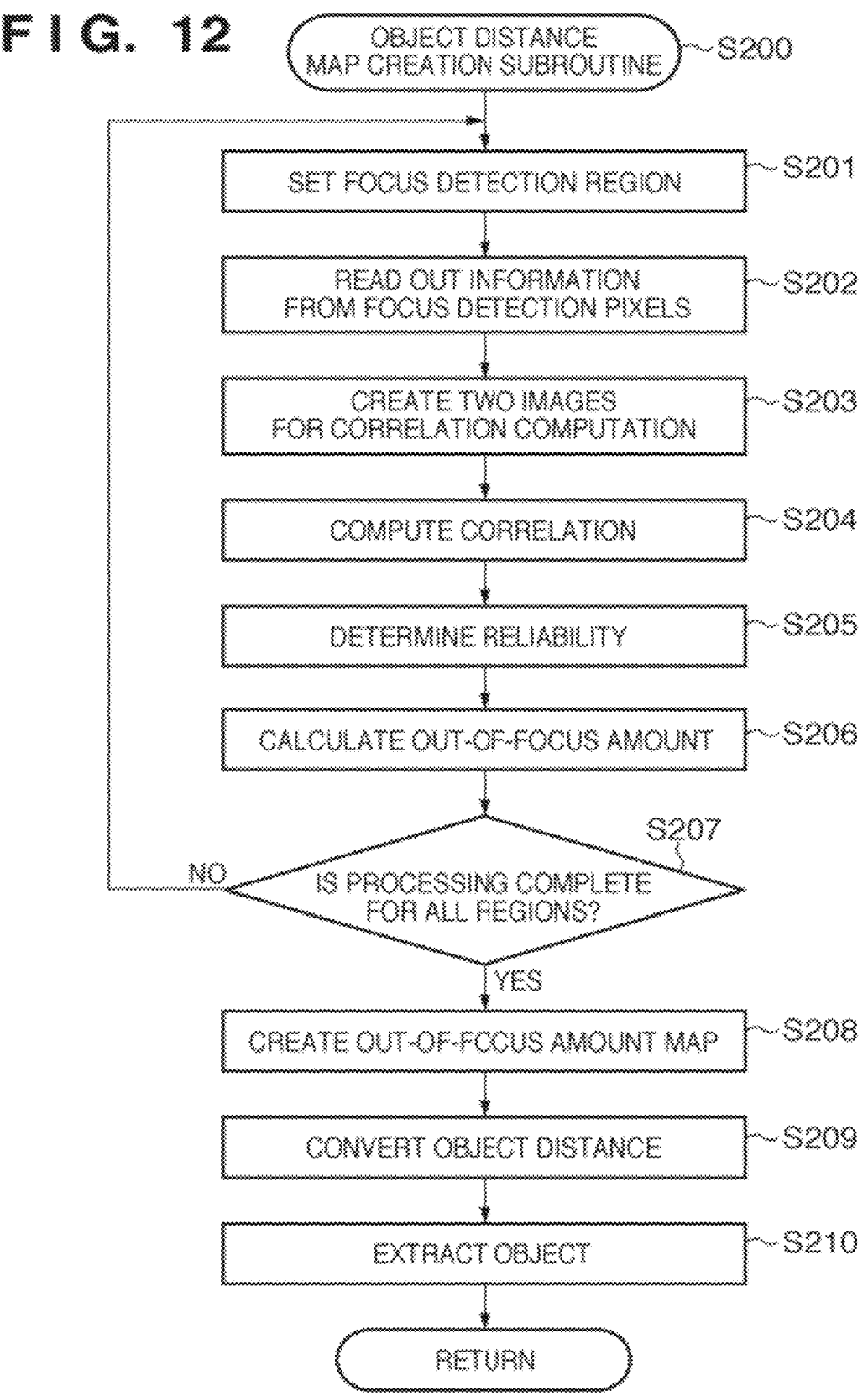

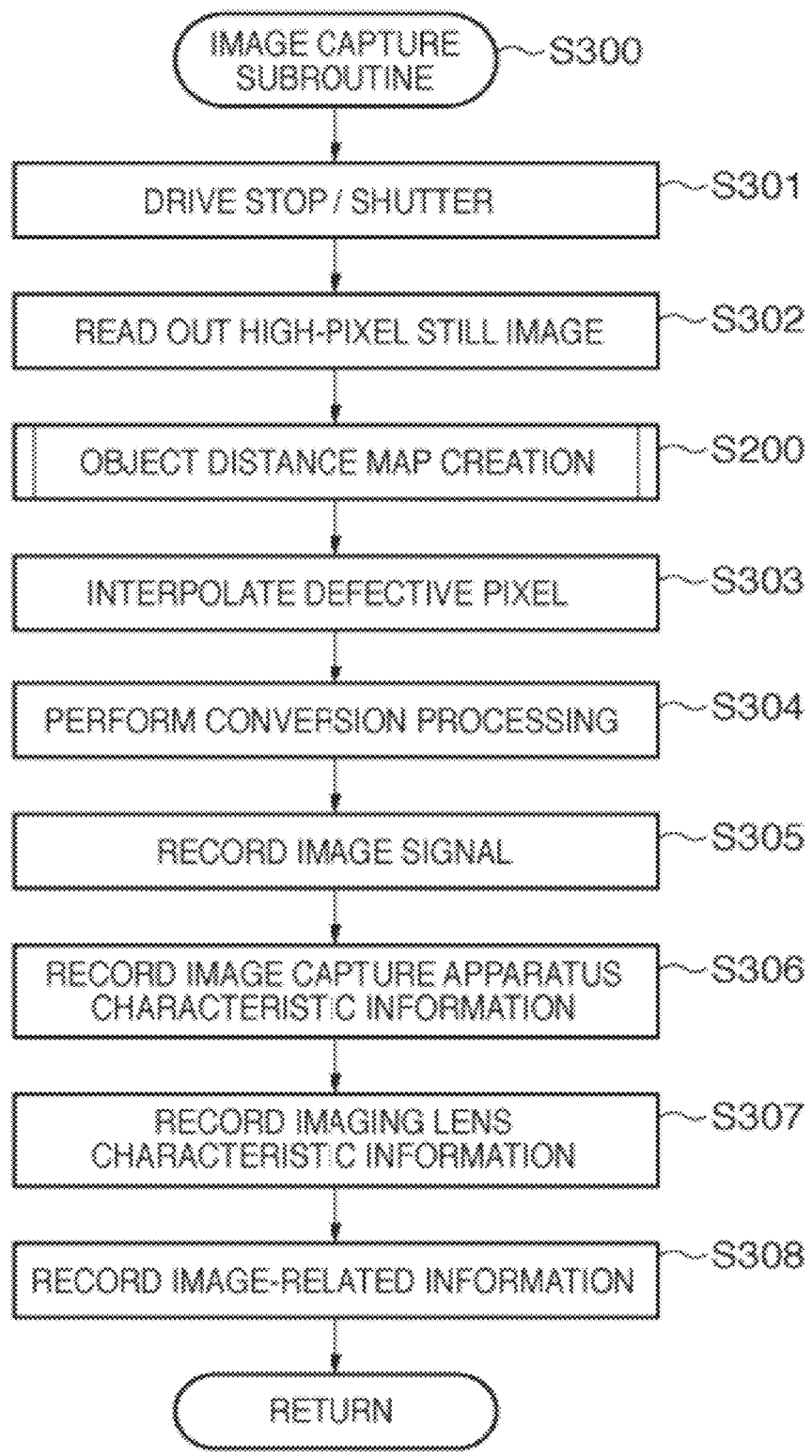

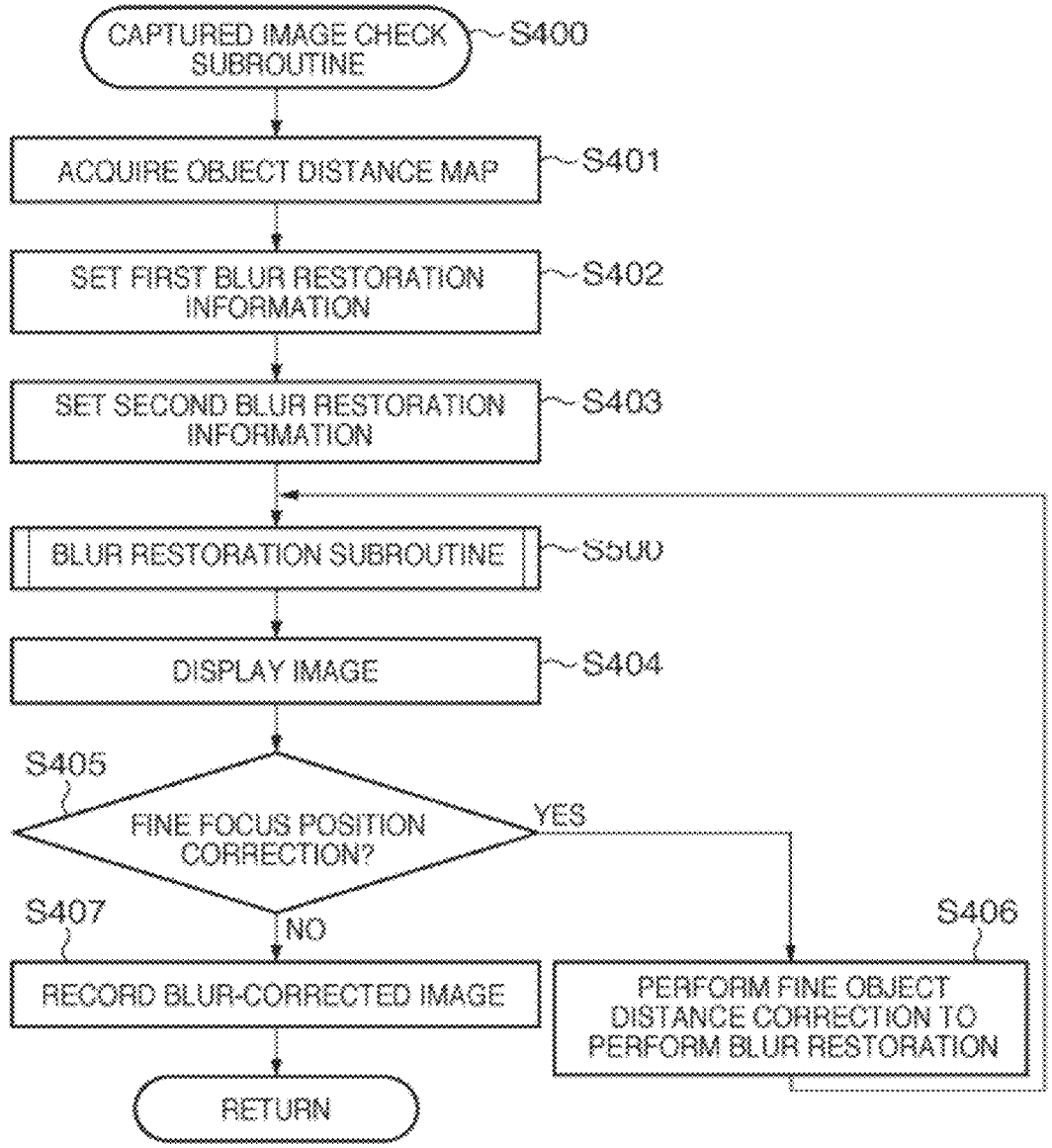

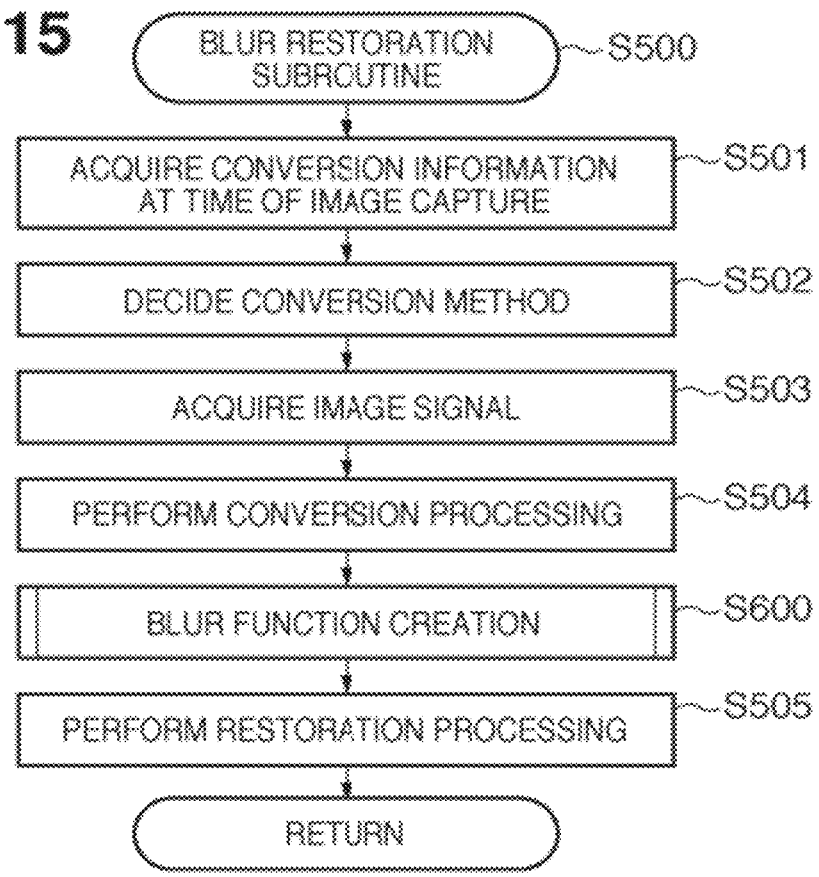
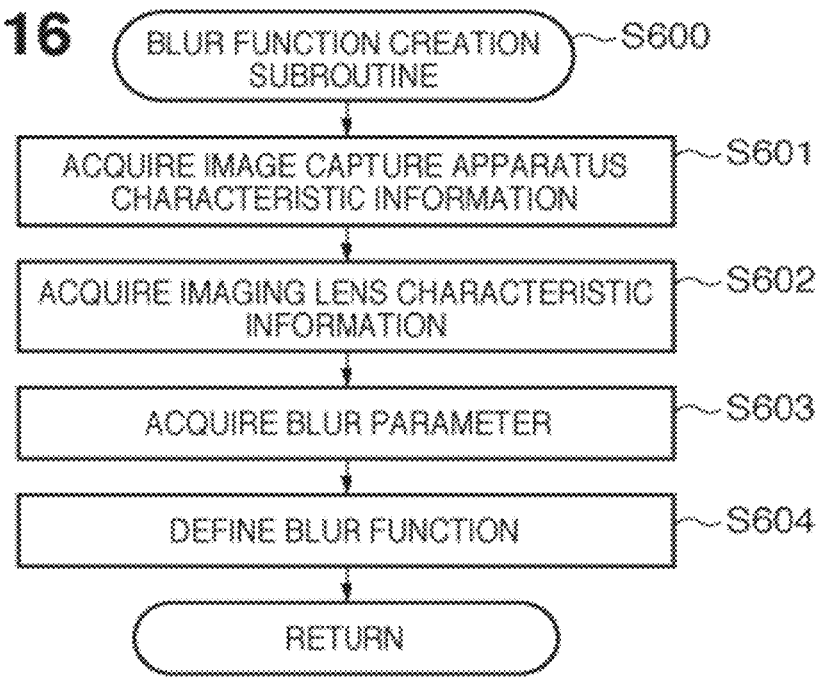

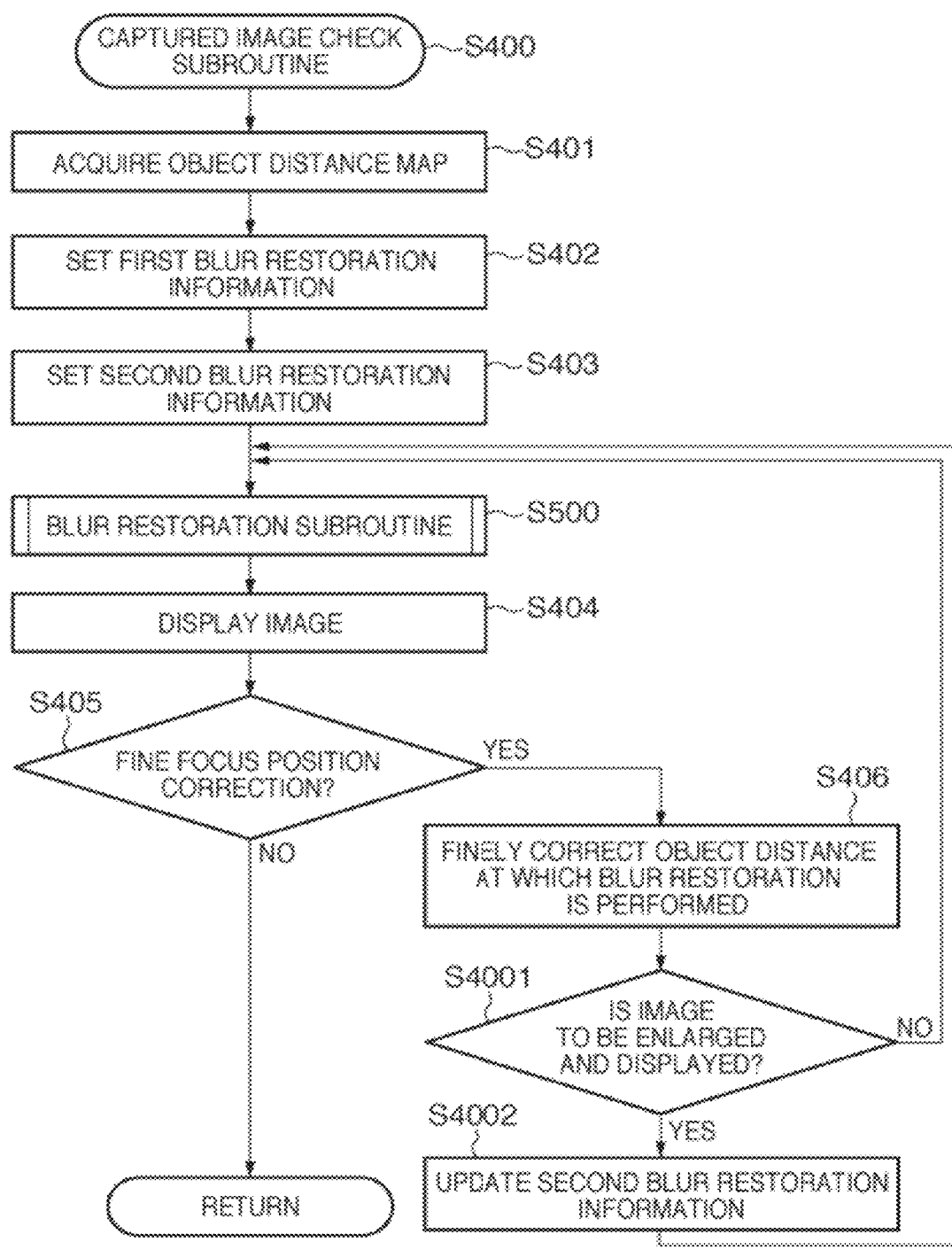

IMAGE PROCESSING APPARATUS AND IMAGE PROCESSING METHOD WITH DECONVOLUTION PROCESSING FOR IMAGE BLUR CORRECTION

BACKGROUND OF THE INVENTION

1. Field of the Invention

The present invention relates to a technique of performing blur restoration based on object distance information in an image.

2. Description of the Related Art

Japanese Patent Laid-Open No. 2000-156823 discloses an image capture apparatus which can calculate object distances based on signals from focus detection pixels discretely distributed among the pixels of an image sensor. Employing the arrangement disclosed in Japanese Patent Laid-Open No. 2000-156823 makes it possible to acquire an object distance distribution in a captured image.

As a method of generating a blur-restored image by restoring a blurred image, there is available a method using a Wiener filter, a general inverse filter, a projection filter, or the like. Japanese Patent Laid-Open No. 2000-20691 discloses a technique of performing blur restoration by using such a method. Using the technique disclosed in Japanese Patent Laid-Open No. 2000-20691 can obtain a degradation function by physical analysis based on image capture conditions and the like or estimation based on an output from a measuring device in an image capture apparatus and restore a blurred image by an image restoration algorithm called deconvolution.

In general, at which object distance focus is to be achieved is decided by a focus state at the time of image capture. For this reason, it is not possible to change the object distance at which focus is achieved after image capture. It is however possible to change the object distance at which focus is to be achieved after image capture by acquiring an object distance distribution in a captured image using the technique disclosed in Japanese Patent Laid-Open No. 2000-156823 and performing blur restoration using the blur restoration technique disclosed in Japanese Patent Laid-Open No. 2000-20691.

However, applying the techniques disclosed in Japanese Patent Laid-Open Nos. 2000-156823 and 2000-20691 to an image processing apparatus will greatly increase the size of resources, require expensive hardware, and take much time for blur restoration processing. This is because, although the range of object distances that allow blur restoration is set by a blur restoration filter corresponding to object distances, blur restoration in the entire range requires an enormous amount of processing contents. In addition, simplifying a blur restoration filter for the simplification of blur restoration processing contents will increase the degree of degradation in the quality of an image after blur restoration.

On the other hand, when an operator captures an image of an object upon rough focus adjustment, it is not necessary to perform blur restoration for the entire range of object distances that allow blur restoration. In this case, finely correcting the focus position relative to a captured image makes it possible to implement restoration intended by the operator. When the operator displays an enlarged captured image, it suffices to perform blur restoration only near the position at which the object displayed within the display range is in focus.

SUMMARY OF THE INVENTION

The present invention has been made in consideration of the above problem and is to properly implement blur restoration within a short period of time.

According to a first aspect of the present invention, there is provided an image processing apparatus comprising a restore unit which performs blur restoration for image data obtained by an image capture unit which photo-electrically converts light from an object which has entered through an imaging lens; an acquisition unit which acquires image-related information stored together with the image data; and an extraction unit which extracts a range of object distances at which the blur restoration is performed, based on the image-related information acquired by the acquisition unit; wherein the restore unit performs blur restoration for the image data in the range of object distances extracted by the extraction unit.

In addition, according to a second aspect of the present invention, there is provided an image processing method comprising the steps of: performing blur restoration for image data obtained by an image capture unit which photo-electrically converts light from an object which has entered through an imaging lens; acquiring image-related information stored together with the image data; and extracting a range of object distances at which the blur restoration is performed, based on the image-related information acquired in the step of acquiring; wherein in the step of restoring, blur restoration is performed for the image data in the range of object distances extracted in the step of extracting.

Further features of the present invention will become apparent from the following description of exemplary embodiments with reference to the attached drawings.

BRIEF DESCRIPTION OF THE DRAWINGS

FIGS. 11A and 11B are main flowcharts for an image processing apparatus according to the first embodiment;

FIG. 12 is a flowchart for an object distance map creation subroutine;

FIG. 13 is a flowchart for an image capture subroutine;

FIG. 14 is a flowchart for a captured image check subroutine in the first embodiment;

FIG. 15 is a flowchart for a blur restoration subroutine;

FIG. 16 is a flowchart for a blur function creation subroutine;

FIG. 19 is a flowchart for a captured image check subroutine in the second embodiment.

DESCRIPTION OF THE EMBODIMENTS

An image processing apparatus according to the first embodiment of the present invention will be described in detail below with reference to FIG. 1 to FIG. 17C.

Figure 1:
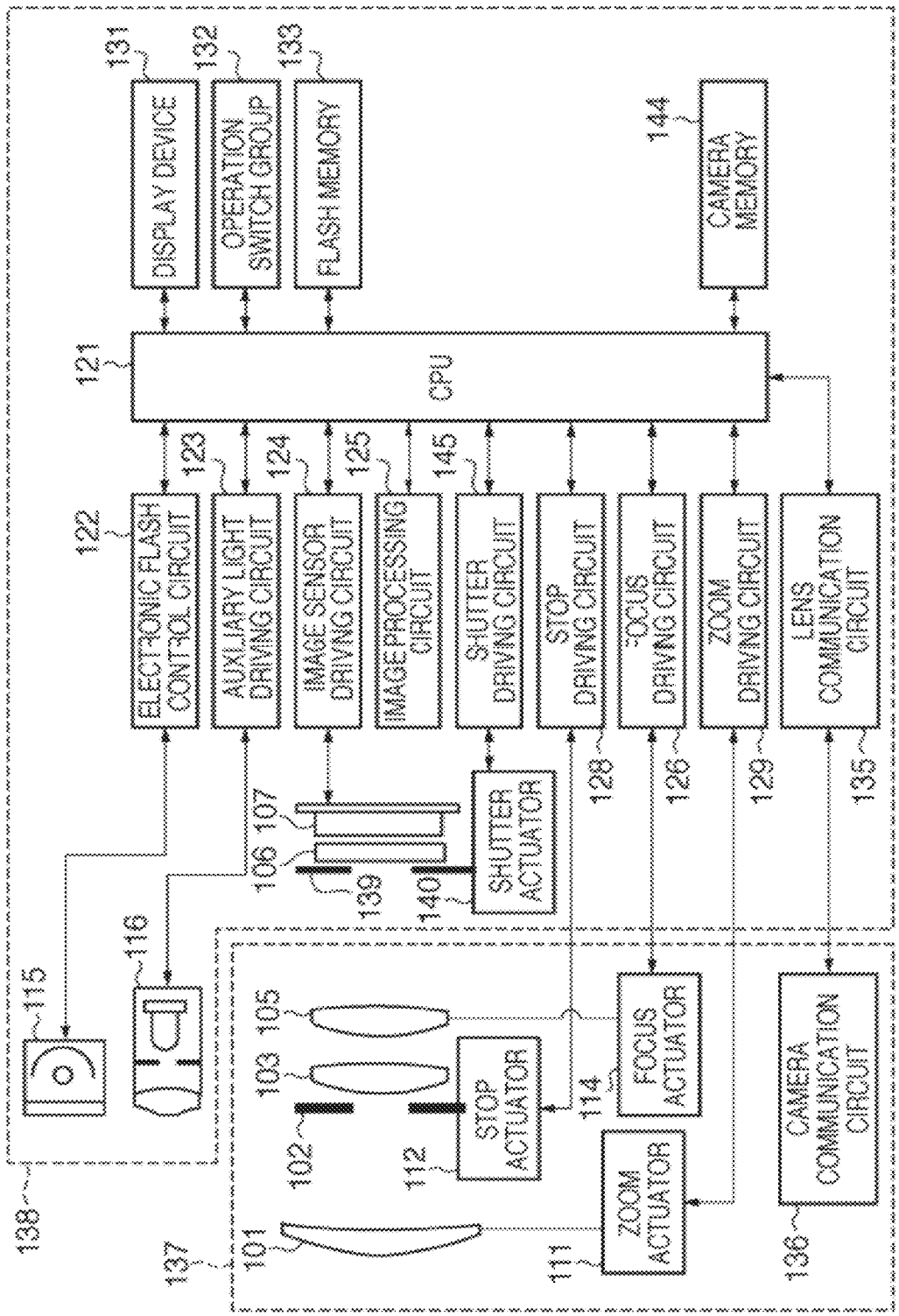
FIG. 1 is a view showing the arrangement of an image processing apparatus according to the first embodiment.

FIG. 1 is a view showing the arrangement of the image processing apparatus according to the first embodiment. Referring to FIG. 1, the image processing apparatus is an electronic camera which includes a camera body 138 having an image sensor and an imaging lens 137 as a discrete component. The imaging lens 137 is interchangeably attached to the camera body 138.

The arrangement of the imaging lens 137 will be described first. Reference numeral 101 denotes a first lens group placed at the distal end of the imaging lens, which is held to be retractable in the optical axis direction; 102, a stop which adjusts the amount of light at the time of image capture by adjusting the aperture diameter; and 103, a second lens group. The stop 102 and the second lens group 103 integrally move back and forth in the optical axis direction. This implements a magnification effect (zoom function) in cooperation with the back-and-forth movement of the first lens group 101. Reference numeral 105 denotes a third lens group which is a focus lens to perform focus adjustment by back-and-forth movement in the optical axis direction; 111, a zoom actuator which performs magnifying operation by making a cam tube (not shown) pivot and moving the first lens group 101 and the second lens group 103 back and forth in the optical axis direction; 112, a stop actuator which adjusts the amount of light for image capture by controlling the aperture diameter of the stop 102; and 114, a focus actuator which performs focus adjustment by driving the third lens group 105 back and forth in the optical axis direction.

Reference numeral 136 denotes a camera communication circuit which transfers information associated with the lens to the camera body 138 or receives information associated with the camera body 138. The information associated with the lens includes a zoom state, a stop state, a focus state, lens frame information, and precision information of the focus driving of the lens. The camera communication circuit 136 transfers these pieces of information to a lens communication circuit 135 provided on the camera body 138 side. Part of these pieces of information associated with the lens may be recorded in the camera body 138. This can reduce the amount of communication between the lens and the camera body, thereby speeding up information processing.

The camera body 138 will be described next. Reference numeral 106 denotes an optical low-pass filter which is an optical element to reduce false colors and moire fringes of a captured image; and 107, an image sensor including a C-MOS sensor and its peripheral circuits. The image sensor 107 is a two-dimensional one-CCD color sensor in which on-chip primary color mosaic filters in a Bayer pattern are formed on m (horizontal)×n (vertical) light-receiving pixels. The image sensor 107 outputs image data by photo-electrically converting light from an object which has entered through the imaging lens 137.

Reference numeral 115 denotes an electronic flash for illuminating an object at the time of image capture, which is preferably a flash illumination device using a xenon tube but may be an illumination device including a continuously emitting LED; 116, an AF auxiliary light device which improves the focus detection performance for a dark object or a low-contrast object by projecting an image of a mask having a predetermined aperture pattern onto an object field through a projection lens; and 121, a camera CPU which performs various kinds of control of the camera body. This CPU 121 includes a computing unit, ROM, RAM, A/C converter, D/A converter, and communication interface circuit. The CPU executes a series of operations such as AF, image capture, image processing, and recording by driving various kinds of circuits of the camera based on predetermined programs stored in the ROM.

Reference numeral 122 denotes an electronic flash control circuit which controls the lighting of the electronic flash 115 in synchronism with image capture operation; 123, an auxiliary light driving circuit which controls the lighting of the AF auxiliary light device 116 in synchronism with focus detection operation; 124, an image sensor driving circuit which controls the image capture operation of the image sensor 107, A/D-converts an acquired image signal, and transmits the resultant signal to the CPU 121; and 125, an image processing circuit which performs processing such as γ conversion, color interpolation, and JPEG compression for the image acquired by the image sensor 107.

Reference numeral 126 denotes a focus driving circuit which performs focus adjustment by driving/controlling the focus actuator 114 based on a focus detection result and driving the third lens group 105 back and forth in the optical axis direction; 128, a stop driving circuit which controls the aperture of the stop 102 by driving/controlling the stop actuator 112; 129, a zoom driving circuit which drives the zoom actuator 111 in accordance with zoom operation by the operator; 135, the lens communication circuit which communicates with the camera communication circuit 136 in the imaging lens 137; 139, a shutter unit which controls exposure time at the time of still image capture; 140, a shutter actuator which moves the shutter unit 139; and 145, a shutter driving circuit which drives the shutter actuator 140.

Reference numeral 131 denotes a display device such as an LCD, which displays information associated with the image capture mode of the camera, a preview image before image capture, a check image after image capture, and an in-focus state display image at the time of focus detection; 132, an operation switch group including a power switch, release (image capture trigger) switch, zoom operation switch, and image capture mode selection switch; 133, a detachable flash memory which records captured images; and 144, a camera memory which stores various data necessary for computation performed by the CPU 121.

Figure 2:
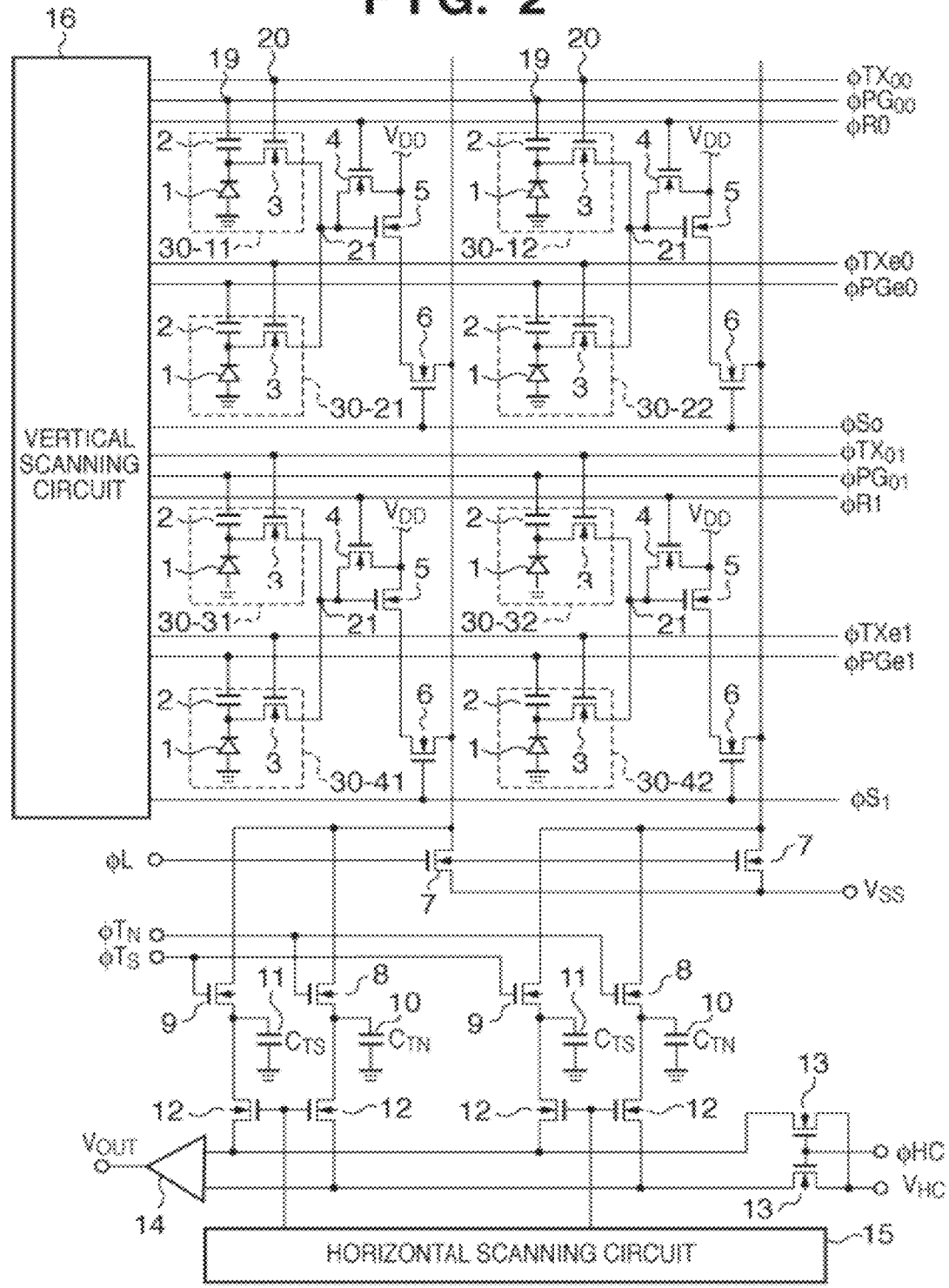
FIG. 2 is a view showing a rough circuit arrangement of an image sensor in the first embodiment.

FIG. 2 is a view showing the schematic circuit arrangement of the image sensor according to the first embodiment, which suitably uses the technique disclosed in Japanese Patent Laid-Open No. 09-046596. FIG. 2 shows the range of 2 (columns)×4 (rows) pixels of a two-dimensional C-MOS area sensor. However, when this sensor is to be used as an image sensor, arranging many pixels like those shown in FIG. 2 can acquire a high-resolution image. This embodiment will exemplify an image sensor with a pixel pitch of 2 μm, the number of effective pixels being 3000 (columns in the horizontal direction)×2000 (rows in the vertical direction)=6,000,000 pixels, and image capture screen size being 6 mm (horizontal)×4 mm (vertical) image capture pixels. Referring to FIG. 2, reference numeral 1 denotes a photo-electric conversion unit of a photo-electric conversion element including a MOS transistor and a depletion layer below the gate; 2, a photo-gate; 3, a transfer switch MOS transistor; 4, a reset MOS transistor; 5, a source-follower amplifier MOS transistor; 6, a horizontal selection switch MOS transistor; 7, a source-follower load MOS transistor; 8, a dark output transfer MOS transistor; 9, a bright output transfer MOS transistor;

10, a dark output storage capacitor CTN; 11, a bright output storage capacitor CTS; 12, a horizontal transfer MOS transistor; 13, a horizontal output line reset MOS transistor; 14, a differential output amplifier; 15, a horizontal scanning circuit; and 16, a vertical scanning circuit.

Figure 3:
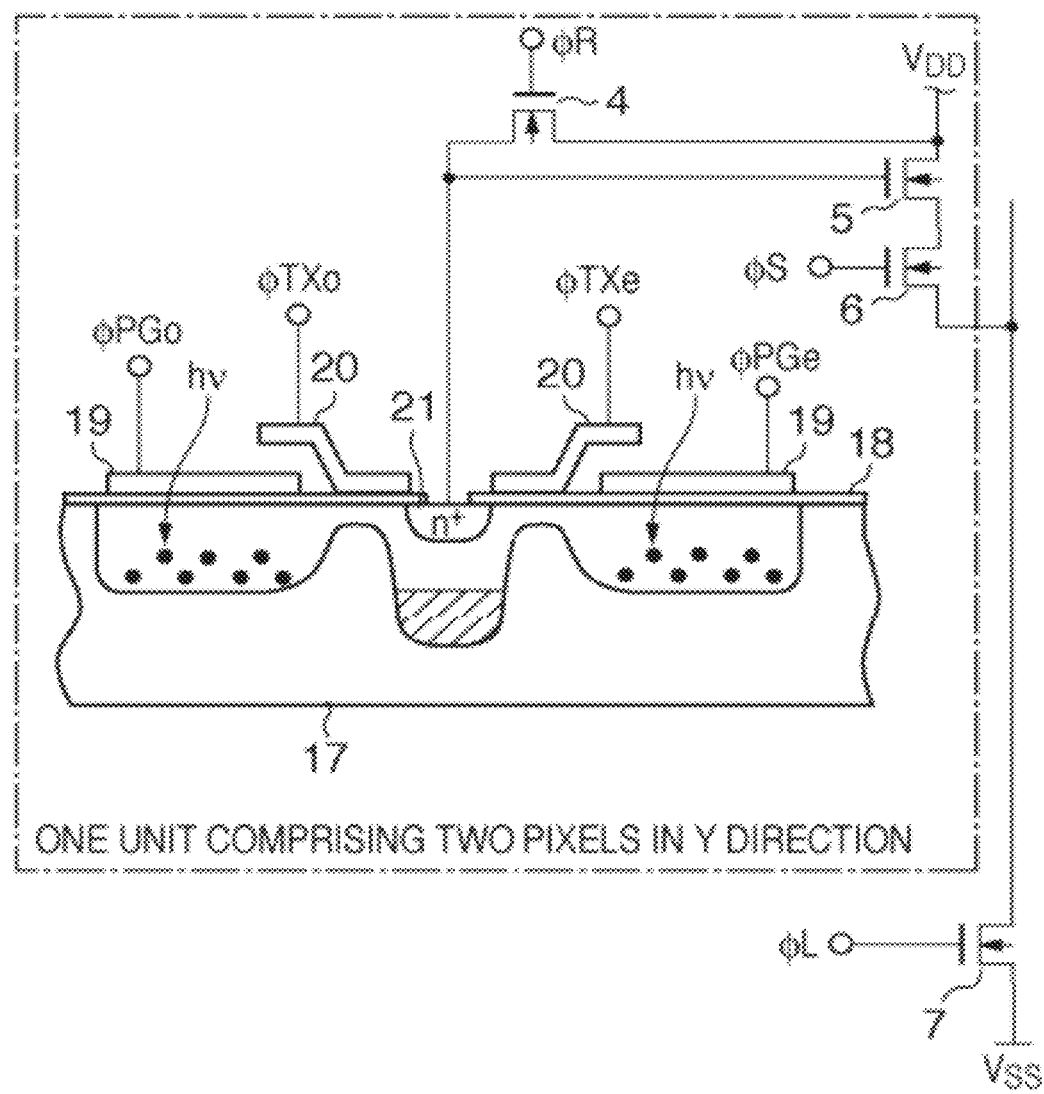
FIG. 3 is a sectional view of a pixel portion of the image sensor.

FIG. 3 is a sectional view of a pixel portion. Referring to FIG. 3, reference numeral 17 denotes a P-type well; 18, a gate oxide film; 19, first layer poly-Si; 20, second layer poly-Si; and 21, an n+ floating diffusion unit (FD). The FD unit 21 is connected to another photo-electric conversion unit via another transfer MOS transistor. Referring to FIG. 3, the drains of the two transfer switch MOS transistors 3 are commonly connected to the FD unit 21 to achieve a reduction in size and improve sensitivity by reducing the capacitance of the FD unit 21. However, the FD units 21 may be connected via Al interconnections.

FIGS. 4A, 4B, 5A, and 5B are views for explaining the structures of image capture pixels and focus detection pixels. This embodiment uses a Bayer pattern in which two pixels having spectral sensitivity to G (green), of 2 (rows)×2 (columns)=four pixels, are diagonally arranged, and pixels having spectral sensitivity to R (red) and B (blue) are respectively arranged as two other pixels. In this Bayer pattern, focus detection pixels are dispersed according to a predetermined rule. The technique of discretely arranging focus detection pixels among image capture pixels is the known technique disclosed in Japanese Patent Laid-Open No. 2000-156823, and hence a description of the technique will be omitted.

Figure 4A:
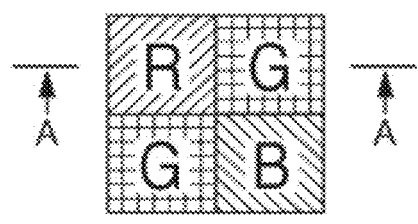
FIGS. 4A and 4B are a plan view and a sectional view, respectively, of focus detection pixels of the image sensor.
Figure 4B:
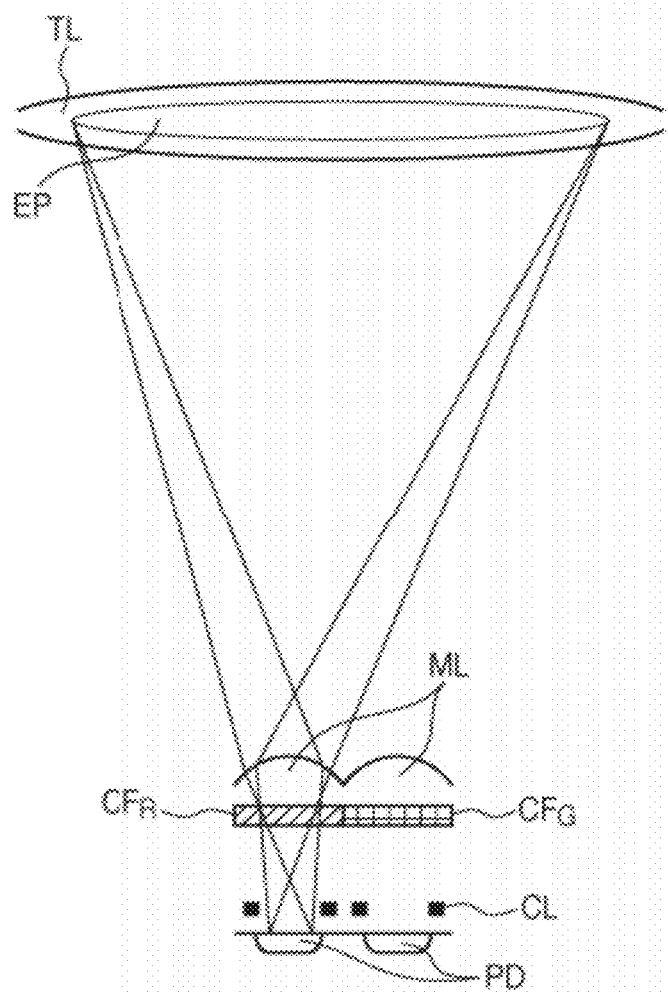

FIGS. 4A and 4B show the arrangement and structure of image capture pixels. FIG. 4A is a plan view of 2 (rows)×2 (columns) image capture pixels. As is known, in a Bayer pattern, G pixels are arranged in a diagonal direction, and R and B pixels are arranged as other two pixels. These 2 (rows)×2 (columns) pixel structures are repeatedly arranged. FIG. 4B is a sectional view taken along A-A in FIG. 4A. Reference symbol ML denotes an on-chip microlens placed on the frontmost surface of each pixel; CFR, an R (Red) color filter; CFG, a G (Green) color filter; PD, a photo-electric conversion unit of a C-MOS sensor described with reference to FIG. 3, which is schematically shown in FIG. 4B; CL, an interconnection layer on which signal lines for transmitting various kinds of signals in the C-MOS sensor are formed; and TL, an image capture optical system which is schematically shown in FIG. 4B.

In this case, the on-chip microlens ML of an image capture pixel and the photo-electric conversion unit PD are configured to receive a light beam having passed through the image capture optical system TL as effectively as possible. In other words, an exit pupil EP of the image capture optical system TL and the photo-electric conversion unit PD are conjugate with each other due to the microlens ML, and the effective area of the photo-electric conversion unit is designed to be large. Although a light beam entering each R pixel has been described with reference to FIG. 4B, each G pixel and each B (Blue) pixel have the same structure. Therefore, the exit pupil EP corresponding to each of R, G, and B pixels for image capture has a large diameter, and efficiently receives a light beam from an object. This improves the S/N ratio of an image signal.

Figure 5B:
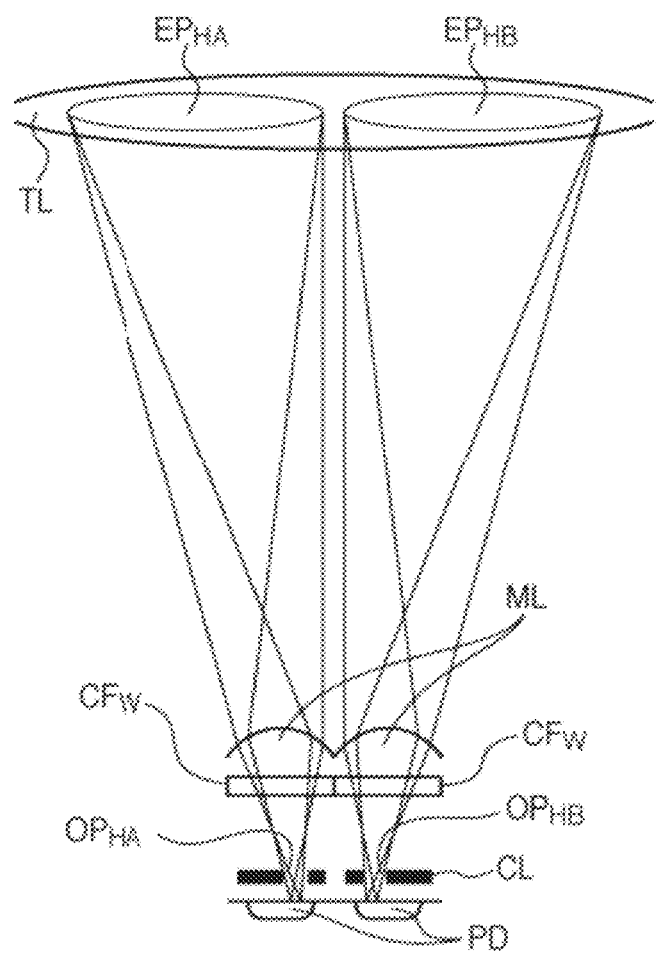
FIGS. 5A and 5B are a plan view and a sectional view, respectively, of focus detection pixels of the image sensor.
Figure 5A:
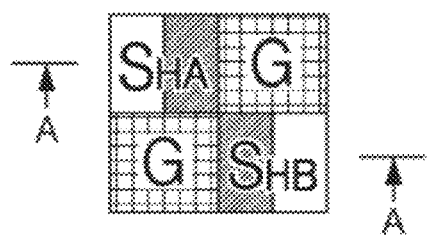

FIGS. 5A and 5B show the arrangement and structure of focus detection pixels for pupil division in the horizontal direction (lateral direction) of an image capture frame. FIG. 5A is a plan view of 2 (rows)×2 (columns) pixels including focus detection pixels. When an image capture signal is obtained, G pixels constitute the main component of luminance information. Since the human image recognition characteristic is sensitive to luminance information, a loss of G pixels makes it easy to notice image quality degradation. In contrast, R or B pixels are pixels for the acquisition of color information. Humans are insensitive to color information. Therefore, even if several pixels to acquire color information are lost, image quality degradation is hard to notice. In this embodiment, of the 2 (rows)×2 (columns) pixels, G pixels are left as image capture pixels, and R and B pixels are used as focus detection pixels. Referring to FIG. 5A, reference symbols SHA and SHB denote these pixels.

FIG. 5B is a sectional view taken along A-A in FIG. 5A. The microlens ML and the photo-electric conversion unit PD have the same structure as that of the image capture pixel shown in FIG. 4B. In this embodiment, since a signal from a focus detection pixel is not used for the creation of an image, a transparent film CFW (White) is used in place of a color separation color filter. In addition, since the image sensor performs pupil division, the position of each opening portion of the interconnection layer CL shifts in one direction relative to the centerline of the corresponding microlens ML. More specifically, an opening portion OPHA of the focus detection pixel SHA shifts rightward, and hence receives a light beam having passed through an exit pupil EPHA on the left side of the imaging lens TL. Similarly, an opening portion OPHB of the focus detection pixel SHB shifts leftward, and hence receives a light beam having passed through an exit pupil EPHB on the right side of the imaging lens TL. Therefore, an object image acquired by a plurality of focus detection pixels SHA regularly arrayed in the horizontal direction will be defined as an A image. An object image acquired by a plurality of focus detection pixels SHB regularly arrayed in the horizontal direction will be defined as a B image. Detecting the relative positions of the A and B images can detect the out-of-focus amount (defocus amount) of the imaging lens 137. In this case, the microlens ML has the function of a lens element to generate a pair of optical images including the A image formed from a light beam transmitted through the exit pupil EPHA on the left side of the imaging lens TL and the B image formed from a light beam transmitted through the exit pupil EPHB on the right side of the imaging lens TL.

Note that the focus detection pixels SHA and SHB can perform focus detection with respect to an object having a luminance distribution in the lateral direction of an image capture frame, for example, a vertical line, but cannot perform focus detection with respect to a horizontal line having a luminance distribution in the longitudinal direction. Therefore, to perform focus detection in the latter case as well, this embodiment includes pixels for pupil division in the vertical direction (longitudinal direction) of the imaging lens.

Figure 6B:
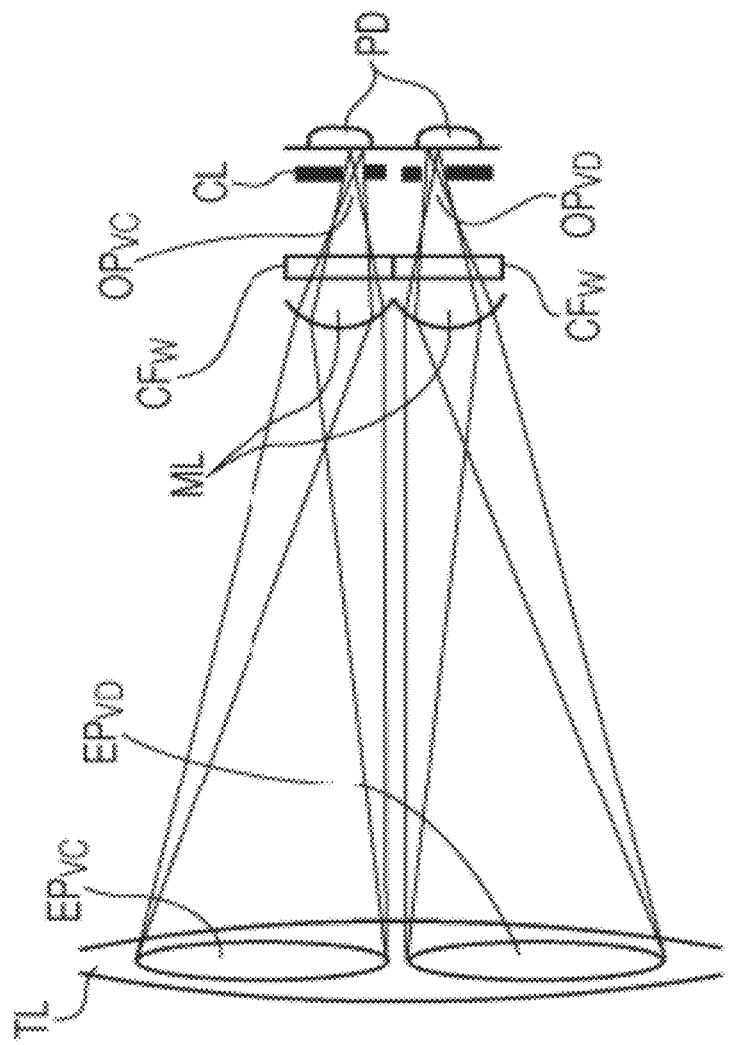
FIGS. 6A and 6B are a plan view and a sectional view, respectively, of other focus detection pixels of the image sensor.
Figure 6A:
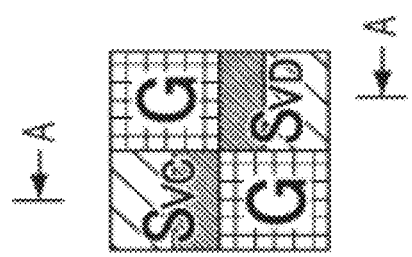

FIGS. 6A and 6B show the arrangement and structure of focus detection pixels for pupil division in the vertical direction of an image capture frame. FIG. 6A is a plan view of 2 (rows)×2 (columns) pixels including focus detection pixels. As in FIG. 5A, G pixels are left as image capture pixels, and R and B pixels are used as focus detection pixels. Referring to FIG. 6A, reference symbols SVC and SVD denote these pixels. FIG. 6B is a sectional view taken along A-A in FIG. 6A. The structure of the pixels in FIG. 6B is the same as that in FIG. 5B except that the pixels in FIG. 6B perform pupil division in the longitudinal direction unlike the pixels in FIG. 5B which perform pupil division in the lateral direction. An opening portion OPVC of the focus detection pixel SVC shifts downward, and hence receives a light beam having passed through an exit pupil EPVC on the upper side of the imaging lens TL. Similarly, an opening portion OPVD of the focus detection pixel SVD shifts upward, and hence receives a light beam having passed through an exit pupil EPVD on the lower side of the imaging lens TL. Therefore, an object image acquired by the plurality of focus detection pixels SVC regularly arrayed in the vertical direction will be defined as a C image. An object image acquired by the plurality of focus detection pixels SVD regularly arrayed in the vertical direction will be defined as a D image. Detecting the relative positions of the C and D images can detect the out-of-focus amount (defocus amount) of the object image having a luminance distribution in the vertical direction of the image capture frame.

Figure 7:
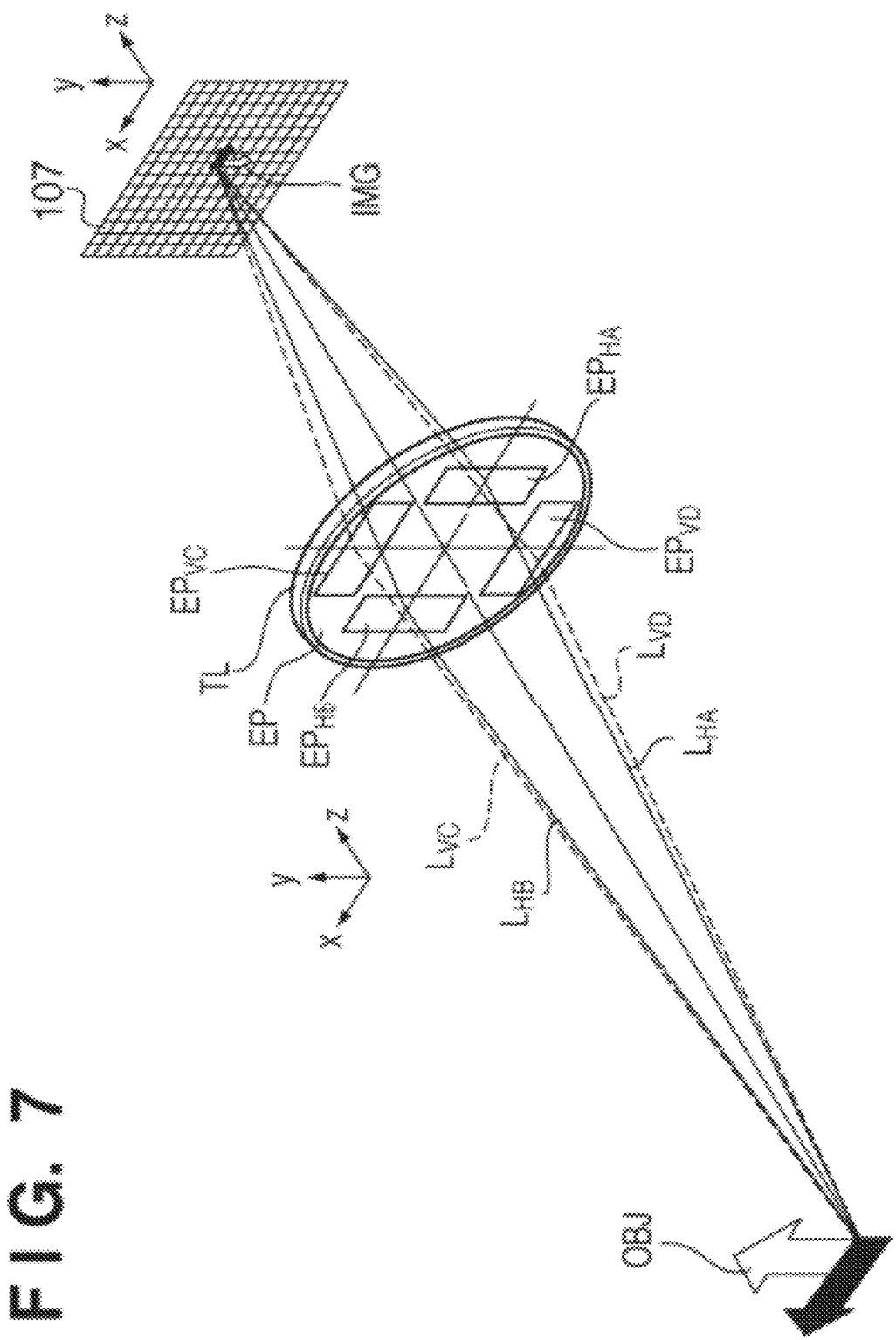
FIG. 7 is a conceptual view for explaining the pupil division state of the image sensor.

FIG. 7 is a conceptual view for explaining the pupil division state of the image sensor in the first embodiment. Reference symbol TL denotes the imaging lens. Reference numeral 107 denotes the image sensor. Reference symbol OBJ denotes an object; and IMG, an object image. As described with reference to FIGS. 4A and 4B, an image capture pixel receives a light beam having passed through the entire exit pupil EP of the imaging lens. On the other hand, a focus detection pixel has a pupil division function, as described with reference to FIGS. 5A, 5B, 6A, and 6B. More specifically, the focus detection pixel SHA in FIGS. 5A and 5B receives a light beam having passed through the left pupil when the rear end of the lens is viewed from the imaging plane, that is, a light beam having passed through the pupil EPHA in FIG. 7. Likewise, the focus detection pixels SHB, SVC, and SVD receive light beams having passed through the pupils EPHB, EPVC, and EPVD, respectively. Distributing the focus detection pixels on the entire region of the image sensor 107 makes it possible to perform focus detection in the entire image capture region.

Figure 8:
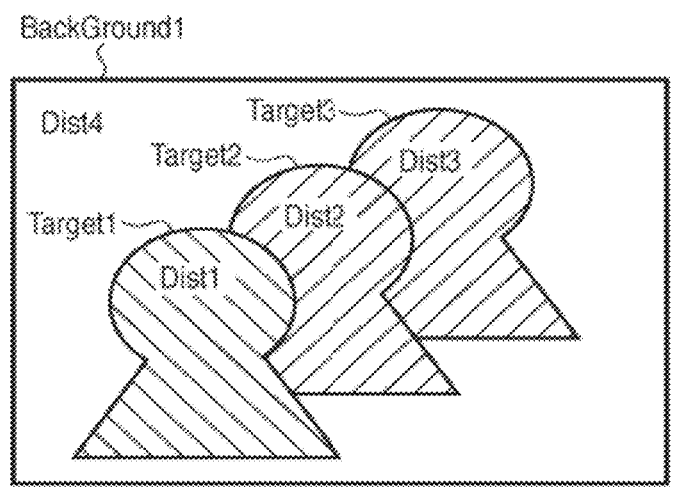
FIG. 8 is a view showing object distance information.

FIG. 8 is a view showing the distance information obtained by the distance information acquisition function of the CPU 121. In the image sensor 107 in the first embodiment, the focus detection pixels SHA, SHB, SVC, and SVD like those described with reference to FIGS. 5A, 5B, 6A, and 6B are distributed in the entire region. This makes it possible to acquire an object distance at an arbitrary position on an image capture frame. Joining and grouping regions in near object distances of the obtained object distance distribution can extract the contour of the object included in the image capture frame. Reference symbols Target1, Target2, and Target3 denote extracted object regions; BackGround1, a background region; and Dist1, Dist2, Dist3, and Dist4, object distances. Dist1 is the representative value of the object distances in the object region Target1. Dist2 is the representative value of the object distances in the object region Target2. Dist3 is the representative value of the object distances in the object region Target3. Dist4 is the object distance in the background region BackGround1. Dist1 is the nearest distance. Dist2 is the second nearest distance. Dist3 is the third nearest distance. Dist4 is the farthest distance. The CPU 121 acquires distance information like that shown in FIG. 8. The CPU 121 extracts objects from the object distance distribution obtained from focus detection pixels and acquires the region and distance of each object.

The image processing apparatus according to this embodiment restores the blur of a captured image (captured image data) based on this distance information and the blur information of the imaging lens. It is possible to estimate a blur generation process from the characteristics of the image processing apparatus or the characteristics of the imaging lens. A blur restoration filter obtained by modeling this blur generation process is defined, and a blurred image is restored by using an image restoration algorithm generally called deconvolution, thereby performing blur restoration. A blur restoration method is disclosed in Japanese Patent Laid-Open No. 2000-20691, and hence a detailed description of the method will be omitted.

Figure 9:
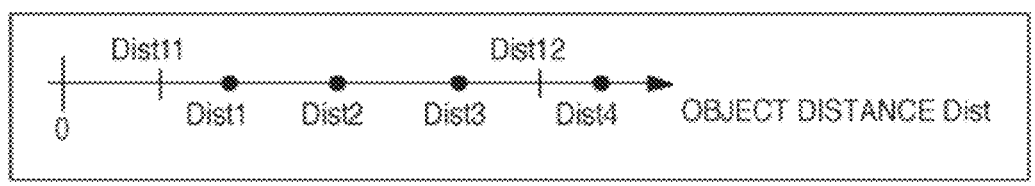
FIG. 9 is a view showing the relationship between object distances and the distances that allow blur restoration.

FIG. 9 is a view showing the relationship between the object distances Dist1, Dist2, Dist3, and Dist4 and the distances that allow blur restoration in a given state of the imaging lens. The distances that allow blur restoration vary depending on the blur restoration filter corresponding to an object distances for each imaging lens which the image processing apparatus includes. The CPU 121 calculates the range of distances that allow blur restoration in accordance with the state of the focus lens of the imaging lens 137. The range of distances that allow blur restoration calculated in this case and the filter used for blur restoration will be referred to as first blur restoration information. Assume that the distance that allows blur restoration on the nearest distance side is defined as a first distance Dist11, and the distance on the infinity side is defined as a second distance Dist12. The blur restoration function of the CPU 121 can perform blur restoration for object images within the range of the first distance Dist11 and the second distance Dist12. Assume that, of the object distances Dist1, Dist2, Dist3, and Dist4 described with reference to FIG. 8, Dist1 to Dist3 fall within the range of the first distance Dist11 and the second distance Dist12, and Dist4 falls out of the range.

Figure 10A:
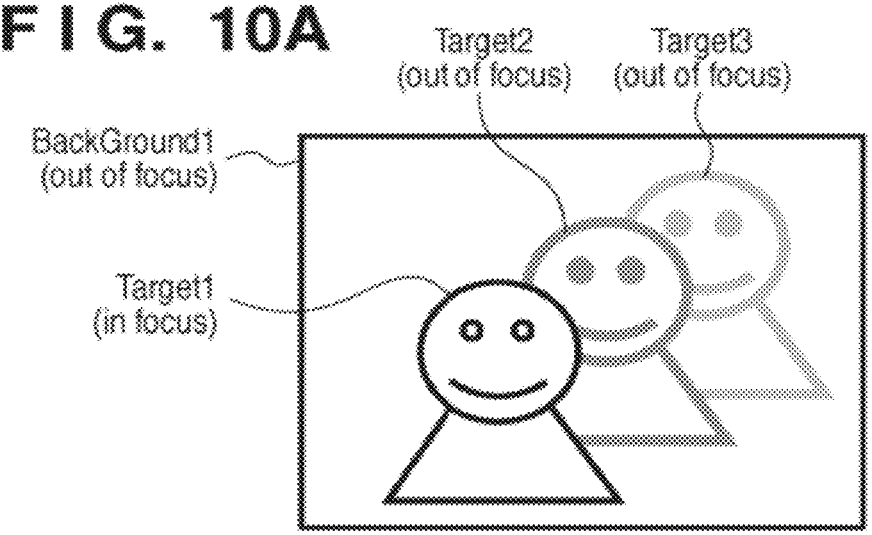
FIGS. 10A to 10C are views showing how the blur of an image is restored.
Figure 10B:
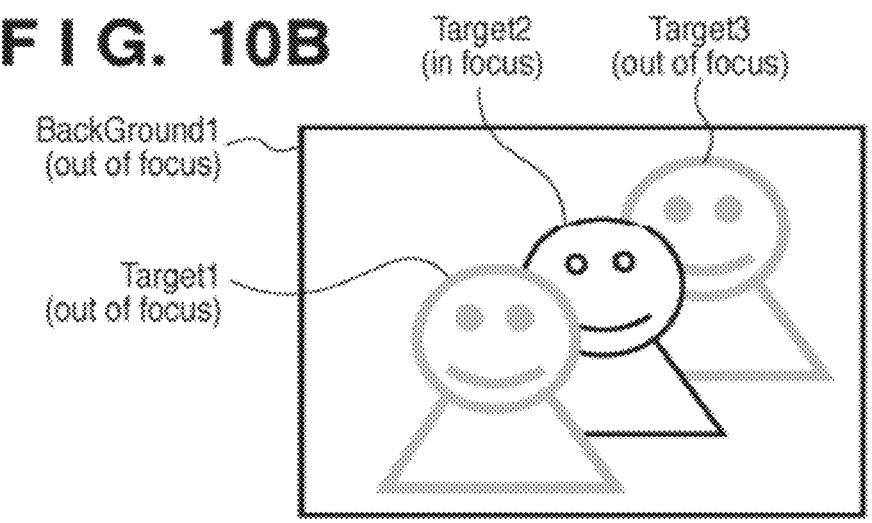
Figure 10C:
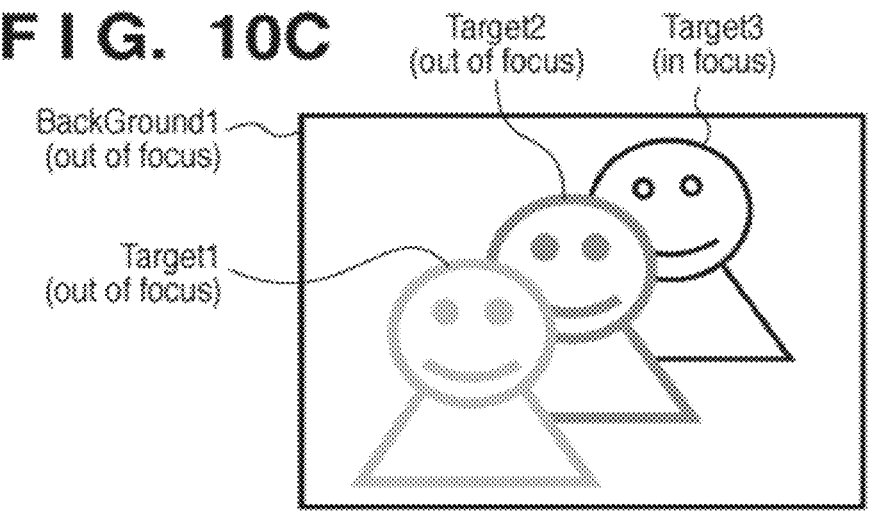

FIGS. 10A to 10C show how a blur restoration unit restores the blur of a captured image. The captured images in FIGS. 10A to 10C are identical to the captured image in FIG. 8. FIG. 10A shows how blur restoration is performed to focus on the object region Target1. The blur restoration unit defines a blur restoration filter from the characteristic information of the image processing apparatus and imaging lens information which correspond to the object distance Dist1 in the object region Target1. Performing restoration processing for the object region Target1 based on this blur restoration filter will restore the blur of the object region Target1 and obtain an in-focus image. At this time, the blur restoration unit performs restoration processing by defining blur restoration filters for regions other than the object region Target1 in the same manner. This makes it possible to acquire an image with focus on the object region Target1 like that shown in FIG. 10A.

FIG. 10B shows how blur restoration is performed to focus on the object region Target2. The blur restoration unit defines a blur restoration filter from the characteristic information of the image processing apparatus and imaging lens information which correspond to the object distance Dist2 in the object region Target2. Performing restoration processing for the object region Target2 based on this blur restoration filter will restore the blur of the object region Target2 and obtain an in-focus image. At this time, the blur restoration unit performs restoration processing by defining blur restoration filters for regions other than the object region Target2 in the same manner. This makes it possible to acquire an image with focus on the object region Target2 like that shown in FIG. 10B.

FIG. 10C shows how blur restoration is performed to focus on the object region Target3. The blur restoration unit defines a blur restoration filter from the characteristic information of the image processing apparatus and imaging lens information which correspond to the object distance Dist3 in the object region Target3. Performing restoration processing for the object region Target3 based on this blur restoration filter will restore the blur of the object region Target3 and obtain an in-focus image. At this time, the blur restoration unit performs restoration processing by defining blur restoration filters for regions other than the object region Target3 in the same manner. This makes it possible to acquire an image with focus on the object region Target3 like that shown in FIG. 10C.

As described with reference to FIGS. 10A to 10C, the image processing apparatus according to this embodiment can select an object which is to come into focus by performing blur restoration based on distance information including the region and distance of each object.

Figure 11A:
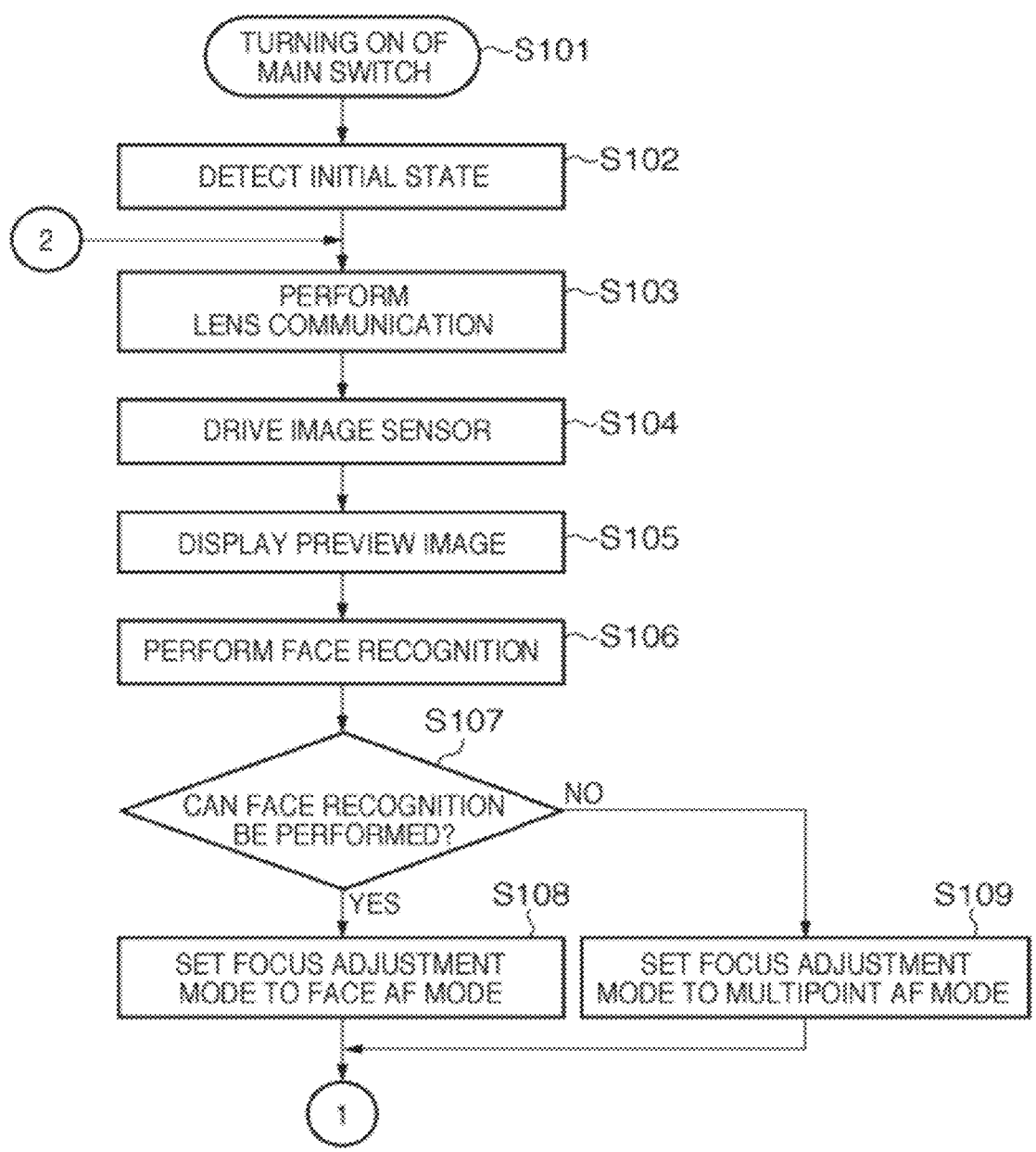

FIGS. 11A to 16 are flowcharts for explaining a focus adjustment process and an image capture process by the image processing apparatus according to the first embodiment of the present invention. FIGS. 11A and 11B are main flowcharts for the image processing apparatus according to this embodiment. The CPU 121 controls the operation in the main flowchart.

When the operator turns on the power switch (step S101), the CPU 121 checks the operations of the respective actuators and image sensor in the camera, initializes the contents of the memory and execution programs, and executes image capture preparation (step S102). In step S103, the CPU 121 performs lens communication with the camera communication circuit 136 in the imaging lens 137 via the lens communication circuit 135. The CPU 121 checks the operation of the lens, initializes the memory contents and execution programs in the lens, and executes preparation operation. The CPU 121 acquires the characteristic data of the lens which is necessary for focus detection and image capture, and stores it in the camera memory 144. In step S104, the CPU 121 starts the image capture operation of the image sensor, and outputs a low-resolution moving image for preview. In step S105, the CPU 121 displays the readout moving image on the display device 131 provided on the rear surface of the camera. The operator then visually checks this preview image to decide a picture composition at the time of image capture.

In step S106, the CPU 121 checks whether the moving image for preview includes any faces. The CPU 121 detects the number, positions, and sizes of faces from the moving image for preview, and records them in the camera memory 144. Since Japanese Patent Laid-Open No. 2004-317699 discloses a technique of recognizing faces, a description of the technique will be omitted. If the CPU 121 has recognized the presence of faces in the image capture region in step S107, the process shifts to step S108 to set the focus adjustment mode to the face AF mode. In this case, the face AF mode is the AF mode of achieving focus in consideration of both the positions of the faces in the image capture region and the object distance map created in step S200. If the CPU 121 recognizes no faces in the image capture region in step S107, the process shifts from step S107 to step S109 to set the focus adjustment mode to the multipoint AF mode. In this case, the multipoint AF mode is a mode of segmenting an image capture region into 3×5=15 regions, estimating a main object based on the focus detection result in each segmented region which is calculated from the object distance map created in step S200 and the luminance information of each object, and bringing the corresponding region into focus.

Upon deciding an AF mode in step S108 or S109, the CPU 121 discriminates in step S110 whether the image capture preparation switch is turned on. If the switch is not turned on, the process advances to step S117 to discriminate whether the main switch is turned off. If the CPU 121 discriminates in step S110 that the image capture preparation switch is turned on, the process shifts to step S200 to execute an object distance map creation subroutine. In step S111, the CPU 121 decides a focus detection position based on the object distance map calculated in step S200. In this case, the detection position decision method is set in the nearest distance priority mode. The CPU 121 sets, as a focus detection position, the position of an object, of the objects obtained in step S200, which is located on the nearest distance side.

In step S112, the CPU 121 calculates an out-of-focus amount at the focus detection position decided in step S111 from the object distance map obtained in step S200, and determines whether the obtained out-of-focus amount is less than or equal to an allowable value. If the out-of-focus amount is larger than the allowable value, the CPU 121 determines an out-of-focus state, and drives the focus lens in step S113. The process then returns to step S110 to determines whether the image capture preparation switch has been pressed. Upon determining in step S112 that an in-focus state has been achieved, the CPU 121 performs in-focus display in step S114. The process shifts to step S115. In step S115, the CPU 121 determines whether the image capture start switch is turned on. If the switch is not turned on, the CPU 121 maintains the image capture standby state in step S115. If the operator turns on the image capture start switch in step S115, the process shifts to step S300 to execute the image capture subroutine.

When the image capture subroutine in step S300 is complete, the process advances to step S116 to determine whether the image capture start switch is off. If the image capture start switch is kept on, the process advances to step S300 again to perform the image capture subroutine. That is, the CPU 121 performs so-called continuous shooting operation. If the CPU 121 determines in step S116 that the image capture start switch is off, the process advances to step S400 to start the captured image check subroutine. When the captured image check subroutine is complete, the process advances to step S117 to determine whether the main switch is turned off. If the main switch is not turned off, the process returns to step S103. If the main switch is turned off, the CPU 121 terminates the series of operations.

FIG. 12 is a flowchart for the object distance map creation subroutine. A distance measurement means, that is, the CPU 121, performs a series of operations in the object distance map creation subroutine. When jumping from step S200 in the main flowchart to step S200 in this subroutine, the CPU 121 sets a focus detection region in step S201. The CPU 121 decides a focus detection region from at least one focus detection region decided based on the AF mode, and then performs processing in step S202 and the subsequent steps. In step S202, the CPU 121 reads out signals from the focus detection pixels in the focus detection region set in step S201. In step S203, the CPU 121 creates two images for correlation computation in step S203. The CPU 121 generates A and B image signals for correlation computation by arranging the signals from the respective focus detection pixels read out in step S202.

In step S204, the CPU 121 performs correlation computation based on the obtained A and B images and calculates the phase difference between the A image and the B image. In step S205, the CPU 121 determines the reliability of the correlation calculation result. In this case, the reliability indicates the degree of coincidence between the A image and the B image. In general, the higher the degree of coincidence between the A image and the B image, the higher the reliability of the focus detection result. For this reason, the CPU 121 determines the reliability of a phase difference detection result depending on whether the degree of coincidence exceeds a given threshold. Alternatively, if a plurality of focus detection regions are selected, the CPU 121 preferentially uses information with higher reliability. In step S206, the CPU 121 computes an out-of-focus amount by multiplying the phase difference between the A image and the B image, obtained in step S204, by a conversion coefficient for the conversion of the phase difference into an out-of-focus amount.

In step S207, the CPU 121 discriminates whether out-of-focus amount calculation is complete for all the focus detection regions. If the CPU 121 determines that out-of-focus amount calculation is not complete for all the focus detection regions, the process returns to step S201 to select and set a focus detection region from the remaining focus detection regions. If the CPU 121 determines in step S207 that out-of-focus amount calculation is complete for all the focus detection regions, the process advances to step S208. In step S208, the CPU 121 creates an out-of-focus amount map from the out-of-focus amounts in all the focus detection regions which are obtained by repeating steps S201 to S207. In this case, the out-of-focus amount map is distribution data indicating the correspondence between positions on an image capture frame and out-of-focus amounts.

In step S209, the CPU 121 converts the out-of-focus amounts in the out-of-focus amount map obtained in step S208 into object distances in consideration of the lens information acquired from the imaging lens 137 by lens communication in step S103. This makes it possible to obtain distribution data indicating the correspondence between the positions on the image capture frame and the object distances. In step S210, the CPU 121 extracts objects based on the object distance distribution data. The CPU 121 extracts the contours of the objects included in the image capture frame by joining and grouping regions of near object distances of the obtained object distance distribution. This can obtain an object distance map indicating the correspondence between the regions of the respective objects and the object distances. Upon completing step S210, the CPU 121 terminates the object distance map creation subroutine. The process then advances to step S111 in the main flowchart.

FIG. 13 is a flowchart for the image capture subroutine. The CPU 121 performs a series of operations in the image capture subroutine. In step S301, the CPU 121 drives a light amount adjustment stop to control the aperture of a mechanical shutter which defines an exposure time. In step S302, the CPU 121 reads out an image for high-pixel still image capture. That is, the CPU 121 reads out all pixels. In step S200, the CPU 121 performs the object distance map creation subroutine described in step S200 by using outputs from the focus detection pixels included in the captured image obtained in step S302. The object distance map obtained by this subroutine, which indicates the correspondence between the regions of the respective objects and the object distances, exhibits the out-of-focus amount of the captured image. As compared with the object distance map creation subroutine in step S200 performed after step S110 in FIG. 11B, this subroutine can obtain an image with a larger number of pixels and create a more accurate object distance map. However, the creation of an object distance map using a high-pixel still image takes much processing time because of a larger number of pixels to be processed, and requires an expensive processing apparatus. It is not therefore essential to create an object distance map.

In step S303, the CPU 121 performs defective pixel interpolation for the readout image signal. That is, an output from each focus detection pixel has no RGB color information, and hence is equivalent to a defective pixel when obtaining an image. For this reason, the CPU 121 creates an image signal by interpolation using information from neighboring image capture pixels. In step S304, the CPU 121 performs image processing such as γ correction, color conversion, and edge enhancement for the image. In step S305, the CPU 121 records the captured image on the flash memory 133.

In step S306, the CPU 121 records the characteristic information of the camera body 138 on the flash memory 133 and the camera memory 144 in correspondence with the captured image recorded in step S305. In this case, the characteristic information of the camera body 138 includes the light reception sensitivity distribution information of the image capture pixels and focus detection pixels of the image sensor 107, the vignetting information of an image capture light beam in the camera body 138, distance information from the mount surface between the camera body 138 and imaging lens 137 to the image sensor 107, and manufacturing error information. The light reception sensitivity distribution information of the image capture pixels and focus detection pixels of the image sensor 107 is determined by the on-chip microlenses ML and the photo-electric conversion units PD. Therefore, these pieces of information may be recorded.

In step S307, the CPU 121 records the characteristic information of the imaging lens 137 on the flash memory 133 and the camera memory 144 in correspondence with the captured image recorded in step S305. In this case, the characteristic information of the imaging lens 137 includes the information of the exit pupil EP, frame information, and F-number information at the time of image capture, aberration information, and manufacturing error information. In step S308, the CPU 121 records image-related information about the captured image on the flash memory 133 and the camera memory 144. The image-related information includes information associated with focus detection operation before image capture, object movement information, and information associated with the precision of focus detection operation.

Information associated with focus detection operation before image capture includes an object distance map and the position information of the focus lens at the time of image capture. These pieces of information are associated with each image and recorded. The CPU 121 calculates object movement information from a plurality of object distance maps obtained when the OFF state of the image capture start switch is not detected in step 5115 in FIG. 11B and the process shifts to step S300, that is, the operation of the apparatus shifts to so-called continuous shooting operation. More specifically, the CPU 121 detects the movement of an object in the image or a change in object distance, that is, an object moving speed, from object distance maps obtained at predetermined time intervals.

In addition, the information associated with the precision of focus detection operation is information associated with the position precision of the focus driving of the lens or information associated with the precision of the distance information of each object which is recorded as an object distance map in step S200. This information allows to estimate how much out-of-focus may have occurred in the captured image relative to the image intended by the operator. If, for example, image capture is performed using a lens with poor position precision of focus driving of the lens, it is possible that the out-of-focus amount of a captured image is relatively large. In contrast, if image capture is performed using a lens with good position precision of focus driving of the lens, it is highly likely that the out-of-focus amount of a captured image is small. The CPU 121 distinguishes large and small expected values of out-of-focus amounts in several levels and records them as information associated with the precision of focus detection operation.

Upon completing step S308, the CPU 121 terminates the image capture subroutine in step S300. The process then advances to step S116 in the main routine.

FIG. 14 is a flowchart for the captured image check subroutine. The CPU 121 also performs a series of operations in the captured image check subroutine. In step S401, the CPU 121 acquires the object distance map created in step S200.

The object distance map acquired in this case may be an object distance map created from a preview image or an object distance map created by high-pixel still image capture. In order to detect object regions and object distances more accurately, it is preferable to use the object distance map created by high-pixel still image capture.

In step S402, the CPU 121 sets a filter used for blur restoration in accordance with the range of object distances that allow blur restoration and object distances. As described in association with the object distance map creation subroutine in step S200, information indicating the correspondence between object regions and object distances is obtained from the object distance map. As described with reference to FIG. 9, distances that allow blur restoration differ depending on the type of imaging lens 137. That is, the first distance Dist11 as the distance on the nearest distance side that allows blur restoration and the second distance Dist12 as the distance on the infinity side change. Therefore, the regions of objects in the image which are located within the range of distances that allow blur restoration determined by the imaging lens 137 (the first distance Dist11 to the second distance Dist12) are set as blur restorable regions. This makes it possible to set the respective object regions and object distances and a blur restoration filter which are used to restore the blur of the regions. Referring to FIG. 8, Target1, Target2, and Target3 are blur restoration ranges, and Dist1, Dist2, and Dist3 are object distance ranges. These blur restorable regions, object distance ranges, and the blur restoration filter used for blur restoration will be referred to as the first blur restoration information.

In step S403, the CPU 121 extracts information from the first blur restoration information set in step S402, and sets second blur restoration information. The CPU 121 also performs this processing. The CPU 121 functions as a blur restoration information extraction means. When setting the second blur restoration information, the CPU 121 uses the image-related information obtained in step S308. More specifically, if focus detection operation is not performed before and after image capture and no object distance map has been calculated, the CPU 121 sets all the blur restoration ranges as regions for which no blur restoration is performed, executes no actual blur restoration processing, and displays the captured image without any change in step S404. In contrast, if an object distance map has been calculated, the CPU 121 sets an object region having a range exhibiting the smallest out-of-focus amount as a blur restorable region, and sets the object distance range of the region. The range of distances that allow blur restoration which is calculated in this case and a filter used for blur restoration will be referred to as second blur restoration information. For example, as shown in FIG. 8, if an object exhibiting the smallest out-of-focus amount, of the objects Target1 to Target3, is Target2 at the distance Dist2, the CPU 121 sets, as a blur restorable region, Target2 and a predetermined range centered on Dist2 as its object distance range. Since Dist2 is the representative value of the object distances in the object region Target2, the distances in all the regions in the object region Target2 are not constant. For this reason, a predetermined range including Dist2 is set as the object distance range of Target2. In this case, the object distance range to be set preferably includes the distance ranges of all the regions in Target2.

Figure 17A:
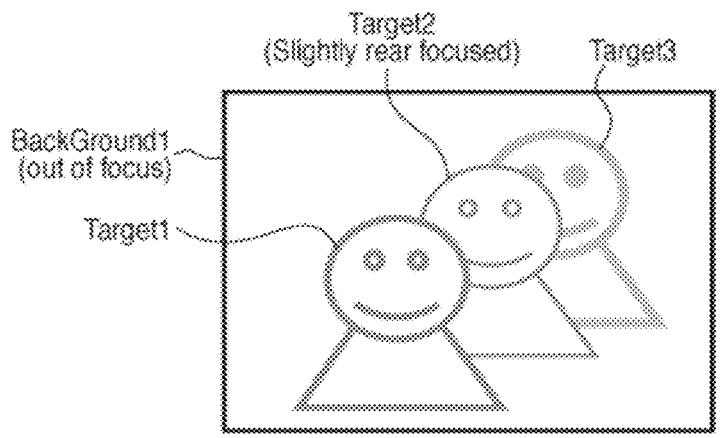
FIGS. 17A to 17C are views showing how the focus position of a captured image is finely corrected.
Figure 17B:
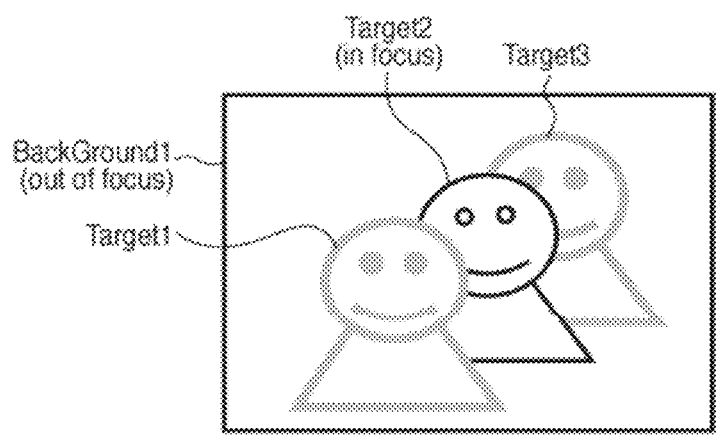
Figure 17C:
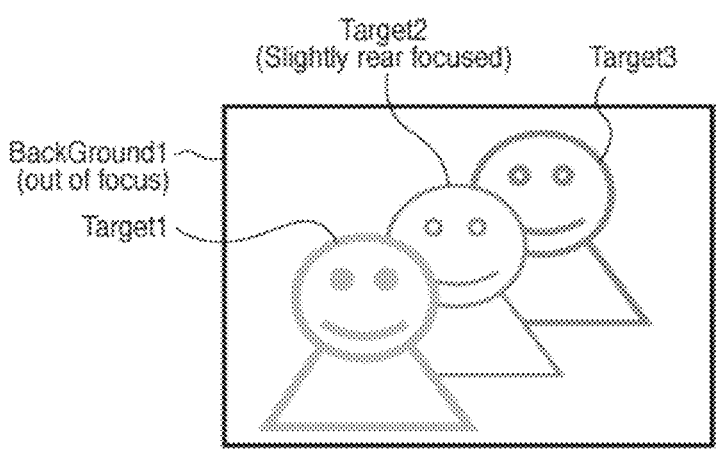
Figure 18:
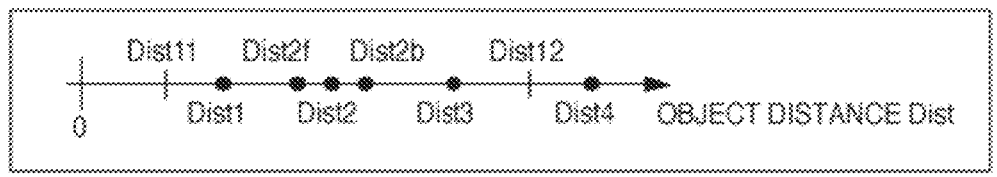
FIG. 18 is a view showing the relationship between object distances at which focus positions are finely corrected and the distances that allow blur restoration.

An object distance range to be set will be described with reference to FIGS. 17A to 17C and 18. FIG. 17B is identical to FIG. 10B. FIGS. 17A and 17C show images obtained by blur restoration performed by slightly shifting focus forward and backward relative to the blur-restored image in FIG. 10B. Blur restoration processing performed by slightly shifting focus is equivalent to the processing of performing blur restoration to focus on an object at an object distance different from Dist2. FIG. 18 shows object distances at which focus is achieved by the blur restoration, performed in FIGS. 17A and 17C, in addition to FIG. 9. Blur restoration in FIG. 17A corresponds to an object distance Dist2f, and blur restoration in FIG. 17C corresponds to an object distance Dist2b. This embodiment sets object distance ranges such that the range of the object distance Dist2f to the object distance Dist2b includes the entire region of the object Target2. These object distance ranges, blur restorable regions, and a blur restoration filter used for blur restoration will be referred to as second blur restoration information.

In addition, it is possible to use object movement information as image-related information. As described above, object movement information is information indicating the movement of an object in an image and an object moving speed. When the CPU 121 records an image signal in step S305 after the lapse of a predetermined period of time since the acquisition of an object distance map, the positions or distances of objects in the image may have changed. The CPU 121 updates the object distance map by calculating the estimated change amounts of object positions and object distances in the image by using object movement information. The CPU 121 sets an object region having a range of small out-of-focus amounts as described above, as a blur restorable region, from the updated object distance map, together with the object distance range.

In addition, it is possible to use information associated with the precision of focus detection operation as image-related information. As described above, information associated with the precision of focus detection operation is information about the position precision of the focus driving of the lens or information about the calculation precision of an object distance map. It is possible to calculate the precision of an out-of-focus amount in an object region in an obtained image from these pieces of precision information. As in the above case, the CPU 121 sets, as a blur restorable region, an object region having the range of smallest out-of-focus amounts within the first range in the image, and sets the object distance range of the region. For example, referring to FIG. 8, if an object, of the objects Target1 to Target3, which exhibits the smallest out-of-focus amount is Target2 at the distance Dist2, the CPU 121 sets, as the second range, Target2 and a predetermined range centered on Dist2 as an object distance range. When setting the object distance range of Target2, the CPU 121 sets an object distance range by using the precision information of an out-of-focus amount. More specifically, if the position precision of the focus driving of the lens is poor and the position of the lens varies relative to a desired position, it is highly likely that the out-of-focus amount of an image is large. For this reason, the CPU 121 sets a range larger than the object distance of the entire region of Target2 as an object distance range. Likewise, if the calculation precision of an object distance map is poor, the CPU 121 sets, as an object distance range, a range larger than the object distance of the entire region of Target2. This makes it possible to set, as an object distance range, the distance range of a region in Target2 including a focus detection error and a focus adjustment error. These object distance maps, object movement information, and information associated with the precision of focus detection operation correspond to image-related information and information associated with distance measurement operation.

When the CPU 121 completely sets the second blur restoration information in step S403, the process advances to the blur restoration subroutine in step S500. In step S404, the CPU 121 displays the image having undergone blur restoration in step S500 on the display device 131. Upon completing step S404, the CPU 121 determines, in step S405, the presence/absence of an instruction to finely correct the focus position. If the operator outputs an instruction to finely adjust the focus position, the process advances to step S406. The CPU 121 corrects the object distance information used for blur restoration in step S500. The CPU 121 corrects the object distance information within the object distance range set in step S403. When the CPU 121 corrects the object distance information in step S406, the process returns to step S500 to perform blur restoration processing again.

If there is no instruction to finely adjust the focus position in step S405, the process advances to step S407 to record the blur-corrected image together with the information used for blur restoration. When completing step S407, the CPU 121 terminates the subroutine for display of check image after image capture. The process then returns to the image capture subroutine.

The following merits are provided by limiting the first blur restoration information decided by the imaging lens and the like by using image-related information and setting the second blur restoration information in this manner. When the operator corrects focus on a captured image, it is highly likely that the object intended by the operator is in focus to some extent. For this reason, if the image processing apparatus performs blur restoration in the entire object distance region in the entire range in which blur restoration can be done, the apparatus performs blur restoration for many restoration regions unnecessary for the operator, and takes much processing time. That is, the operator cannot perform comfortable operation. Narrowing the range subjected to blur restoration based on information associated with a captured image as in this embodiment allows to perform blur restoration processing for only a narrower object distance range including the image intended by the operator to be subjected to blur restoration. This can reduce the calculation load on blur restoration processing. In addition, since the processing time is short, it is possible to perform focus correction processing comfortable for the operator.

FIG. 15 is a flowchart for the blur restoration subroutine. The CPU 121 also performs a series of operations in the blur restoration subroutine. In step S501, the CPU 121 acquires conversion information indicating the contents of conversion processing in the image processing circuit 125. In step S502, the CPU 121 decides a conversion method to be used to convert image information supplied from the image processing circuit 125. More specifically, the CPU 121 decides a conversion method based on the conversion information acquired in step S501 (which includes, in addition to the conversion information, the image processing apparatus characteristics and imaging lens characteristic information acquired in steps S306 and S307), as needed. The conversion method decided in this case is a method of converting image information so as to make exposure values and pixel values have a linear relationship in order to secure linearity as a prerequisite for the algorithm for image restoration processing disclosed in Japanese Patent Laid-Open No. 2000-20691.

When, for example, the image processing circuit 125 executes gamma correction, the CPU 121 executes conversion inverse to conversion based on gamma correction in step S502. This can reproduce the image before conversion and acquire an image having linearity. Likewise, when the image processing circuit 125 executes color correction, the CPU 121 executes conversion inverse to conversion based on color correction in S502. This makes it possible to acquire an image having linearity. As described above, in step S502, the CPU 121 decides a conversion method equivalent to conversion inverse to the conversion processing performed by the image processing circuit 125.

In step S503, the image processing circuit 125 acquires a captured image. In step S504, the image processing circuit 125 converts the acquired captured image in accordance with the conversion method decided in step S502. When the image processing circuit 125 completes the conversion processing in step S504, the process advances to step S600 to create a blur function. The above blur restoration filter is synonymous with a blur function. In step S505, the CPU 121 performs conversion inverse to the blur function created in step S600 to perform blur restoration processing for the captured image having undergone the conversion processing in step S504. In this case, the CPU 121 performs blur restoration processing by the image restoration algorithm generally called deconvolution processing. This makes it possible to obtain a blur-restored image by restoring the blur of a predetermined object. Since Japanese Patent Laid-Open No. 2000-20691 discloses the method of performing blur restoration by performing conversion processing inverse to a blur function, a description of the method will be omitted. Upon completing step S505, the CPU 121 terminates the blur restoration subroutine. The process then advances to step S404 in the subroutine for display of check image after image capture.

FIG. 16 is a flowchart for the blur function creation subroutine. The CPU 121 also performs a series of operations in the blur function creation subroutine. In step S601, the CPU 121 acquires the characteristic information of the camera body 138 recorded on the camera memory 144 in step S305 at the time of image capture. In step S602, the CPU 121 acquires the characteristic information of the imaging lens 137 recorded on the camera memory 144 in step S306 at the time of image capture.

In step S603, the CPU 121 acquires parameters to be used to define a blur function. The blur function is decided by the optical transfer characteristics between the imaging lens 137 and the image sensor 107. The optical transfer characteristics change depending on factors such as the characteristic information of the camera body 138, the characteristic information of the imaging lens 137, the positions of object regions in a captured image, and object distances. Therefore, the camera memory 144 stores in advance table data which associates these factors with parameters to be used to define a blur function. Upon executing step S603, the CPU 121 acquires parameters to be used to define a blur function from the camera memory 144 based on these factors.

In step S604, the CPU 121 defines a blur function based on the blur parameters acquired in step S603. For example, a blur function includes a Gaussian distribution based on the assumption that a blur phenomenon complies with a normal distribution rule. Letting r be the distance from a central pixel and σ2 be an arbitrary parameter in the normal distribution rule, a blur function h(r) is given by $$h(r)=\{1/(\sigma\sqrt{(2\pi)})\}\cdot\exp(-r^2/\sigma^2)$$

Upon completing step S604, the CPU 121 terminates the blur function creation subroutine. The process then advances to step S505 in the blur restoration subroutine.

In the above case, the image processing apparatus according to the first embodiment performs fine focus correction at the time of reproduction immediately after image capture. However, fine focus correction can be performed in other cases. The present invention can also be applied to a case in which the apparatus reproduces a previously captured image and then performs focus correction.

The image processing apparatus according to the first embodiment has exemplified the camera with the exchangeable imaging lens. However, this apparatus may be applied to a camera including a fixed imaging lens, that is, a so-called fixed lens camera. Even a fixed lens camera suffers from the conventional problem. Narrowing the image range of blur restoration as described in this embodiment can obtain a similar effect.

The image processing apparatus according to the first embodiment has exemplified the camera configured to perform focus detection using the image sensor. However, this apparatus may be applied to a camera including another focus detection means. Even a camera including another focus detection means suffers from the conventional problem. Narrowing the image range of blur restoration as described in this embodiment can obtain a similar effect.

(Second Embodiment)

An image processing apparatus according to the second embodiment of the present invention will be described below with reference to FIG. 19. The second embodiment differs from the first embodiment in image-related information used to set the second image range. The arrangement according to the second embodiment allows an operator to recognize an intended object more accurately and can set the second image range of blur restoration more accurately.

Note that in the second embodiment, the block diagram (FIG. 1) showing the arrangement of the image processing apparatus according to the first embodiment, the method of executing focus detection (FIGS. 2 to 7), the blur restoration method (FIG. 8 to FIG. 10C), the operation associated with image capture (FIGS. 11A to 13), and the operation associated with blur restoration processing (FIGS. 15 and 16) are the same as those in the first embodiment, and hence a description of them will be omitted.

The captured image check subroutine performed in step S400 in the main flowchart for the image processing apparatus in FIG. 11B will be described in detail with reference to the flowchart of FIG. 19. The same step numbers as in the flowchart of FIG. 19 denote portions which perform the same processes as in FIG. 14 which is a flowchart for the captured image check subroutine in the first embodiment.

In step S401, a CPU 121 acquires the object distance map created in step S200. The object distance map acquired in this case may be an object distance map created from a preview image or an object distance map created by high-resolution still image capture. In order to detect object regions and object distances more accurately, it is preferable to use the object distance map created by high-resolution still image capture.

In step S402, the CPU 121 sets the range of object distances that allow blur restoration and a filter used for blur restoration in accordance with object distances. As described in association with the object distance map creation subroutine in step S200, information indicating the correspondence between object regions and object distances is obtained from the object distance map. As described with reference to FIG. 9, distances that allow blur restoration differ depending on the type of imaging lens 137. That is, a first distance Dist11 as the distance on the nearest distance side that allows blur restoration and a second distance Dist12 as the distance on the infinity side change. Therefore, the regions of objects in the image which are located within the range of distances that allow blur restoration determined by an imaging lens 137 (the first distance Dist11 to the second distance Dist12) are set as blur restorable regions. This makes it possible to set the respective object regions and object distances and a blur restoration filter which are used to restore the blur of the regions. Referring to FIG. 8, Target1, Target2, and Target3 are blur restoration ranges, and Dist1, Dist2, and Dist3 are object distance ranges. These blur restorable regions, object distance ranges, and the blur restoration filter used for blur restoration will be referred to as the first blur restoration information.

In step S403, the CPU 121 extracts information from the first blur restoration information set in step S402, and sets second blur restoration information. The CPU 121 also performs this processing. The CPU 121 functions as a blur restoration information extraction means. When setting the second blur restoration information, the CPU 121 uses the image-related information obtained in step S308. More specifically, if focus detection operation is not performed before and after image capture and no object distance map has been calculated, the CPU 121 sets all the blur restoration ranges as regions for which no blur restoration is performed, executes no actual blur restoration processing, and displays the captured image without any change in step S404. In contrast, if an object distance map has been calculated, the CPU 121 sets an object region having a range exhibiting the smallest out-of-focus amount as a blur restorable region, and sets the object distance range of the region. The range of distances that allow blur restoration which is calculated in this case and a filter used for blur restoration will be referred to as second blur restoration information. For example, as shown in FIG. 8, if an object exhibiting the smallest out-of-focus amount, of the objects Target1 to Target3, is Target2 at the distance Dist2, the CPU 121 sets, as a blur restorable region, Target2 and a predetermined range centered on Dist2 as its object distance range. Since Dist2 is the representative value of the object distances in the object region Target2, the distances in all the regions in the object region Target2 are not constant. For this reason, a predetermined range including Dist2 is set as the object distance range of Target2.

In this case, the object distance range to be set preferably includes the distance ranges of all the regions in Target2. An object distance range to be set will be described with reference to FIGS. 17A to 17C and 18. FIG. 17B is identical to FIG. 10B. FIGS. 17A to 17C show images obtained by blur restoration performed by slightly shifting focus forward and backward relative to the blur-restored image in FIG. 10B. Blur restoration processing performed by slightly shifting focus is equivalent to the processing of performing blur restoration to focus on an object at an object distance different from Dist2. FIG. 18 shows object distances at which focus is achieved by the blur restoration, performed in FIGS. 17A and 17C, in addition to FIG. 9. Blur restoration in FIG. 17A corresponds to an object distance Dist2$f$, and blur restoration in FIG. 17C corresponds to an object distance Dist2$b$. This embodiment sets object distance ranges such that the range of the object distance Dist2$f$ to the object distance Dist2$b$ includes the entire region of the object Target2. These object distance ranges, blur restorable regions, and a blur restoration filter used for blur restoration will be referred to as second blur restoration information.

In addition, it is possible to use object movement information as image-related information. As described above, object movement information is information indicating the movement of an object in an image and an object moving speed. When the CPU 121 records an image signal in step S305 after the lapse of a predetermined period of time since the acquisition of an object distance map, the positions or distances of objects in the image may have changed. The CPU 121 updates the object distance map by calculating the estimated change amounts of object positions and object distances in the image by using object movement information. The CPU 121 sets an object region having a range of small out-of-focus amounts as described above, as a blur restorable region, from the updated object distance map, together with the object distance range.

In addition, it is possible to use information associated with the precision of focus detection operation as image-related information. As described above, information associated with the precision of focus detection operation is information about the position precision of the focus driving of the lens or information about the calculation precision of an object distance map. It is possible to calculate the precision of an out-of-focus amount in an object region in an obtained image from these pieces of precision information. As in the above case, the CPU 121 sets, as a blur restorable region, an object region having the range of smallest out-of-focus amounts within the first range in the image, and sets the object distance range of the region. For example, referring to FIG. 8, if an object, of the objects Target1 to Target3, which exhibits the smallest out-of-focus amount is Target2 at the distance Dist2, the CPU 121 sets, as the second range, Target2 and a predetermined range centered on Dist2 as an object distance range. When setting the object distance range of Target2, the CPU 121 sets an object distance range by using the precision information of an out-of-focus amount. More specifically, if the position precision of the focus driving of the lens is poor and the position of the lens varies relative to a desired position, it is highly likely that the out-of-focus amount of an image is large. For this reason, the CPU 121 sets a range larger than the object distance of the entire region of Target2 as an object distance range. Likewise, if the calculation precision of an object distance map is poor, the CPU 121 sets, as an object distance range, a range larger than the object distance of the entire region of Target2. This makes it possible to set, as an object distance range, the distance range of a region in Target2 including a focus detection error and a focus adjustment error. These object distance maps, object movement information, and information associated with the precision of focus detection operation correspond to image-related information and information associated with distance measurement operation.

When the CPU 121 completely sets the second image range and the distance range of the object in step S403, the process advances to the blur restoration subroutine in step S500. In step S404, the CPU 121 displays the image having undergone blur restoration in step S500 on the display device 131. Upon completing step S404, the CPU 121 determines, in step S405, the presence/absence of an instruction to finely correct the focus position. If the operator outputs an instruction to finely adjust the focus position, the process advances to step S406. The CPU 121 corrects the object distance information used for blur restoration in step S500. The CPU 121 corrects the object distance information within the object distance range set in step S403.

When the CPU 121 completes step S406, the process shifts to step S4001 to determine whether an enlarged image is displayed (to determine a display state). In general, the image display device provided for the image processing apparatus is not sufficiently large, enlarging and displaying a captured image will facilitate to check the focus state of the captured image. If the image is enlarged and displayed, the process advances to step S4002 to update the second blur restoration information. As described above, when an image is enlarged, the enlarged and displayed range can be estimated as a blur restoration region desired by the operator. If the displayed region is narrower than the blur restoration region which has already been set, the CPU 121 updates the region and sets the second blur restoration information again. The enlargement display information of an image used in this case corresponds to both image-related information and image-display-related information. If the image is not enlarged and displayed in step S4001 or the second blur restoration information is updated in step S4002, the process returns to step S500 to perform blur restoration processing again. If there is no instruction to perform fine focus position correction in step S405, the CPU 121 terminates the subroutine for display of check image after image capture. The process then returns to the image capture subroutine.

The following merits can be obtained by limiting the first blur restoration information to be decided from the imaging lens to image-related information and setting the second blur restoration information. When the operator enlarges and displays a captured image and corrects the focus, it is highly likely that the object intended by the operator is enlarged and displayed. Narrowing the range of blur restoration from enlargement information at the time of reproduction which is associated with a captured image as in this embodiment allows to perform only blur restoration processing for a narrower object distance range including the image intended by the operator to be subjected to blur restoration. This can reduce the calculation load on blur restoration processing. In addition, since the processing time is short, the operator can comfortably perform focus correction processing.

Note that in the above embodiment, when the operator issues an instruction to perform fine focus position correction, an image with focus on the position desired by the operator is provided by performing blur restoration processing in a narrower object distance range. However, it is possible to display a blur-restored image by performing blur restoration so as to focus on an object intended by the operator based on the above image-related information when displaying a preview image before image capture, a check image after image capture, or an in-focus image at the time of focus detection. Performing blur restoration for an image based on image-related information in this manner can obtain a blur-restored image reflecting the intention of the operator.

The preferred embodiments of the present invention have been described above. However, the present invention is not limited to these embodiments. Various modifications and changes of the embodiments can be made within the spirit and scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-165054, filed Jul. 13, 2009 which is hereby incorporated by reference herein in its entirety.

What is claimed is:

1. An image processing apparatus comprising:
   a restore unit which performs blur restoration for image data obtained by an image capture unit which photoelectrically converts light from an object which has entered through an imaging lens;
   and
   a setting unit which sets a range of an object distance at which the blur restoration is performed, based on information associated with the imaging lens and an object distance of an object in the image data;
   wherein said restore unit performs deconvolution processing as blur restoration for the image data in the range of object distance.

2. The apparatus according to claim 1, further comprising a display control unit which performs control to display the image data having undergone blur restoration by said restore unit on a display unit.

3. The apparatus according to claim 1, wherein the setting unit sets the range of an object distance based on information includes at least one of information associated with focus detection operation before image capture, object movement information, and precision information of focus detection operation.

4. The apparatus according to claim 1, wherein said restore unit performs blur restoration by restoration processing based on an optical transfer characteristic between the imaging lens and said image capture unit.

5. The apparatus according to claim 1, further comprising a focus detection unit which acquires information associated with an object distance,
  wherein is information associated with focus detection operation of said focus detection unit before image capture.

6. The apparatus according to claim 1, further comprising a display unit which displays the image obtained by said image capture unit,
  wherein the setting unit sets the range of an object distance based on information indicating a display state of an image displayed by said display unit.

7. The apparatus according to claim 1, wherein the setting unit sets the range of an object distance within distances that allow blur restoration.

8. The apparatus according to claim 1, wherein the setting unit sets the range of an object distance so as to include an object having a range exhibiting the smallest out-of-focus amount.

9. An image processing method comprising the steps of:
performing blur restoration for image data obtained by an image capture unit which photo-electrically converts light from an object which has entered through an imaging lens;
and
setting a range of object distance at which the blur restoration is performed, based on information associated with the imaging lens and an object distance of an object in the image data
wherein in the step of restoring, deconvolution processing is performed as blur restoration for the image data in the range of an object distance.

* * * * *